United States Patent
Li et al.

(10) Patent No.: US 12,262,273 B2
(45) Date of Patent: *Mar. 25, 2025

(54) METHOD AND APPARATUS FOR CONTROLLING DISORDER OF DOWNLINK DATA

(71) Applicant: HUAWEI TECHNOLOGIES CO., LTD., Shenzhen (CN)

(72) Inventors: Yongcui Li, Beijing (CN); Fang Yu, Shenzhen (CN); Yan Li, Beijing (CN); Hui Ni, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,915

(22) Filed: Jan. 25, 2024

(65) Prior Publication Data
US 2024/0172052 A1 May 23, 2024

Related U.S. Application Data

(63) Continuation of application No. 17/318,814, filed on May 12, 2021, now Pat. No. 11,910,244, which is a (Continued)

(30) Foreign Application Priority Data
Nov. 14, 2018 (CN) .......................... 201811354479.3

(51) Int. Cl.
*H04W 36/00* (2009.01)
*H04W 36/12* (2009.01)

(52) U.S. Cl.
CPC ........ *H04W 36/12* (2013.01); *H04W 36/0011* (2013.01)

(58) Field of Classification Search
CPC ............ H04W 36/0011; H04W 36/12; H04W 72/1273; H04W 72/20; H04W 36/02
See application file for complete search history.

(56) References Cited

U.S. PATENT DOCUMENTS

| | | | | |
|---|---|---|---|---|
| 2012/0177002 A1* | 7/2012 | Faucher | ................ | H04W 36/02 370/331 |
| 2012/0281564 A1 | 11/2012 | Zhang et al. | | |

(Continued)

FOREIGN PATENT DOCUMENTS

| | | |
|---|---|---|
| CN | 101047967 A | 10/2007 |
| CN | 107371198 A | 11/2017 |

(Continued)

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC)(Release 16)," 3GPP TR 23.725 V1.1.0, total 67 pages, 3rd Generation Partnership Project, Valbonne, France (Oct. 2018).

(Continued)

*Primary Examiner* — Hoang-Chuong Q Vu
(74) *Attorney, Agent, or Firm* — Leydig, Voit & Mayer, Ltd.

(57) ABSTRACT

This application provides a method for controlling disorder of downlink data and an apparatus thereof. The method includes: A control plane network element determines to switch from a first user plane device to a second user plane device, and sends indication information to the second user plane device. The second user plane device buffers, according to the received indication information, downlink data (Continued)

received from a session anchor, and sends the buffered downlink data after reception of an end marker from the first user plane device.

15 Claims, 26 Drawing Sheets

Related U.S. Application Data continuation of application No. PCT/CN2019/103422, filed on Aug. 29, 2019.

(56) References Cited

U.S. PATENT DOCUMENTS

| | | | |
|---|---|---|---|
| 2017/0206238 A1 | 7/2017 | Coutinho et al. | |
| 2017/0251514 A1 | 8/2017 | Soderlund et al. | |
| 2019/0059027 A1* | 2/2019 | Yang | H04W 36/0064 |
| 2019/0059067 A1 | 2/2019 | Lee et al. | |
| 2019/0116486 A1* | 4/2019 | Kim | H04W 8/10 |
| 2019/0159106 A1* | 5/2019 | Jin | H04W 40/24 |
| 2019/0174375 A1* | 6/2019 | Hapsari | H04W 88/14 |
| 2019/0268811 A1 | 8/2019 | Makinen et al. | |
| 2019/0268815 A1 | 8/2019 | Zhu et al. | |
| 2019/0289447 A1 | 9/2019 | Zhou et al. | |
| 2020/0084663 A1 | 3/2020 | Park et al. | |
| 2020/0107213 A1 | 4/2020 | Park et al. | |
| 2020/0107253 A1 | 4/2020 | Albasheir et al. | |
| 2020/0120570 A1 | 4/2020 | Youn et al. | |
| 2020/0137663 A1 | 4/2020 | Albasheir et al. | |
| 2020/0329408 A1* | 10/2020 | Selvaganapathy | H04W 76/20 |
| 2020/0337093 A1* | 10/2020 | Kim | H04W 64/00 |
| 2021/0051761 A1 | 2/2021 | Kahn et al. | |
| 2021/0345193 A1 | 11/2021 | Miklos | |

FOREIGN PATENT DOCUMENTS

| | | |
|---|---|---|
| CN | 107846703 A | 3/2018 |
| CN | 108282819 A | 7/2018 |
| JP | 2011004415 A | 1/2011 |
| KR | 20130118945 A | 10/2013 |
| RU | 2009136530 A | 4/2011 |
| WO | 2018081994 A1 | 5/2018 |
| WO | 2020253551 A1 | 12/2020 |

OTHER PUBLICATIONS

"3rd Generation Partnership Project; Technical Specification Group Services and System Aspects; System Architecture for the 5G System; Stage 2 (Release 15)," 3GPP TS 23.501 V15.3.0, total 226 pages, 3rd Generation Partnership Project, Valbonne, France (Sep. 2018).

"3rd Generation Partnership Project; Technical Specification Group Services and System Aspects; Procedures for the 5G System; Stage 2 (Release 15)," 3GPP TS 23.502 V15.3.0, total 330 pages, 3rd Generation Partnership Project, Valbonne, France (Sep. 2018).

Huawei, HiSilicon, "Clarify how to send end marker during HO procedure," 3GPP TSG-SA2 Meeting #126, Montreal, Canada, S2-181999, total 3 pages, 3rd Generation Partnership Project, Valbonne, France (Feb. 20, 2018).

CATT, "Discussion on End Marker," 3GPP TSG-RAN WG3 #NR AdHoc 1807, Montreal, Canada, R3-183798, total 2 pages, 3rd Generation Partnership Project, Valbonne, France (Jul. 2-6, 2018).

"23.501: Editorial corrections and EN Removal," SA WG2 Meeting #124, Reno, Nevada, USA, S2-179096, Total 160 pages, 3rd Generation Partnership Project, Valbonne, France (Nov. 27-Dec. 1, 2017).

* cited by examiner

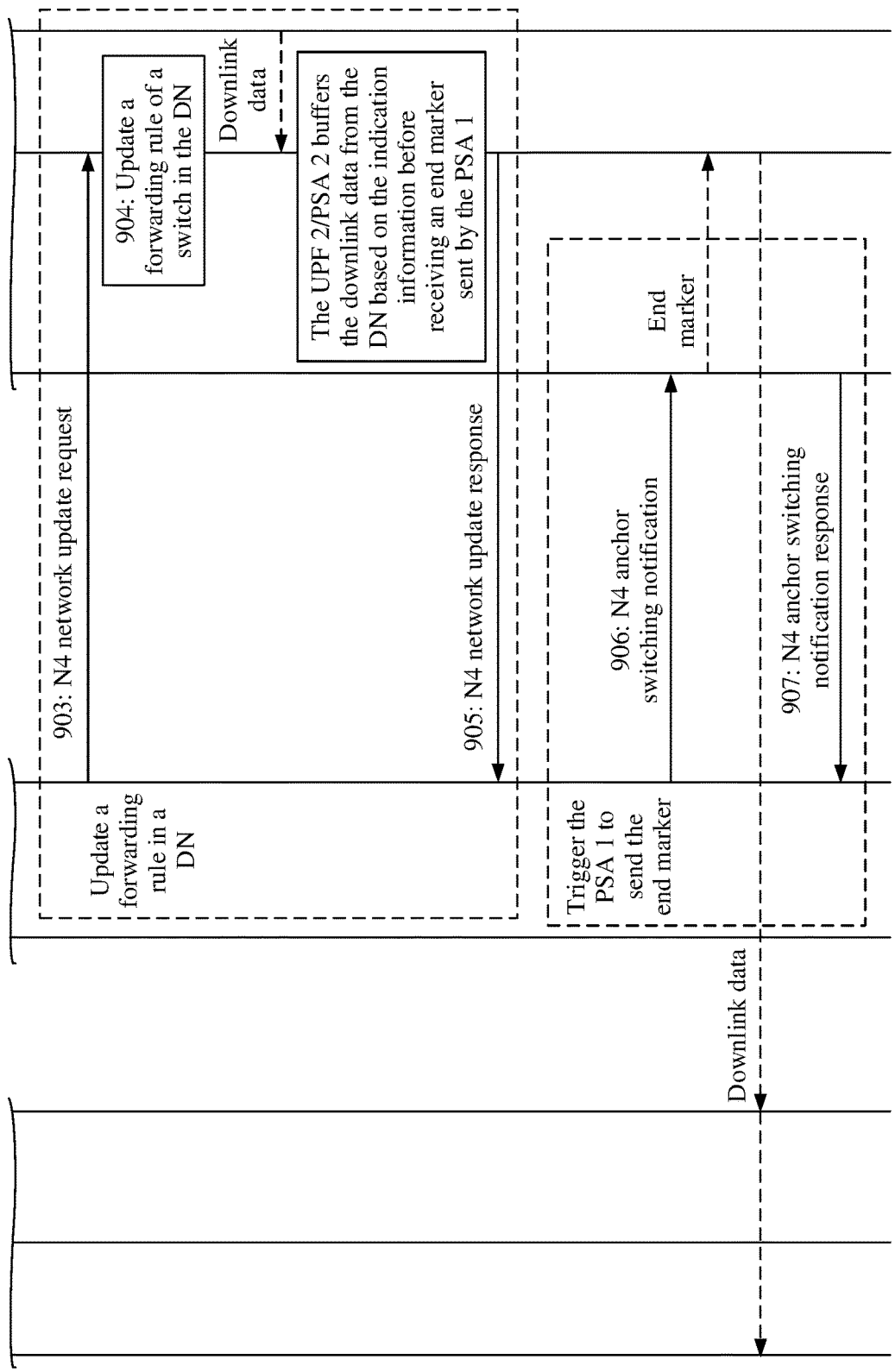

FIG. 10C

- 1009: N4 network update request
- 1010: Update a forwarding rule of a switch in the DN
- Downlink data
- 1011: N4 network update response
- 1012: N4 anchor switching notification
- End marker
- 1013: N4 anchor switching response

- Update a forwarding rule in a DN
- The RAN 2 buffers the downlink data before receiving an end marker on the forwarding tunnel
- The UPF 2 sends the end marker to the RAN 2 through the forwarding tunnel
- The RAN 2 sends the buffered downlink data to the UE

- Trigger the PSA 1 to send the end marker
- Downlink data

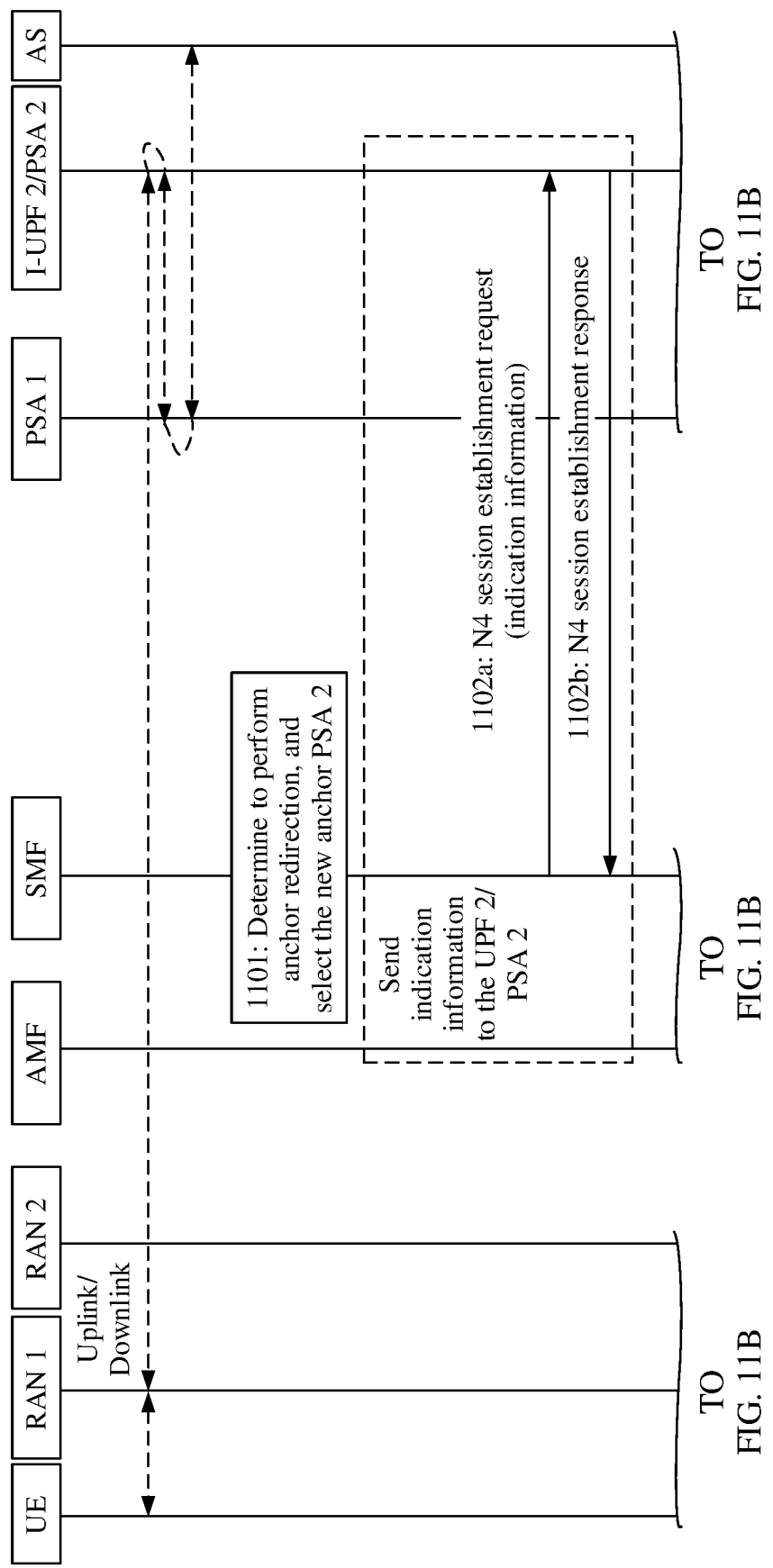

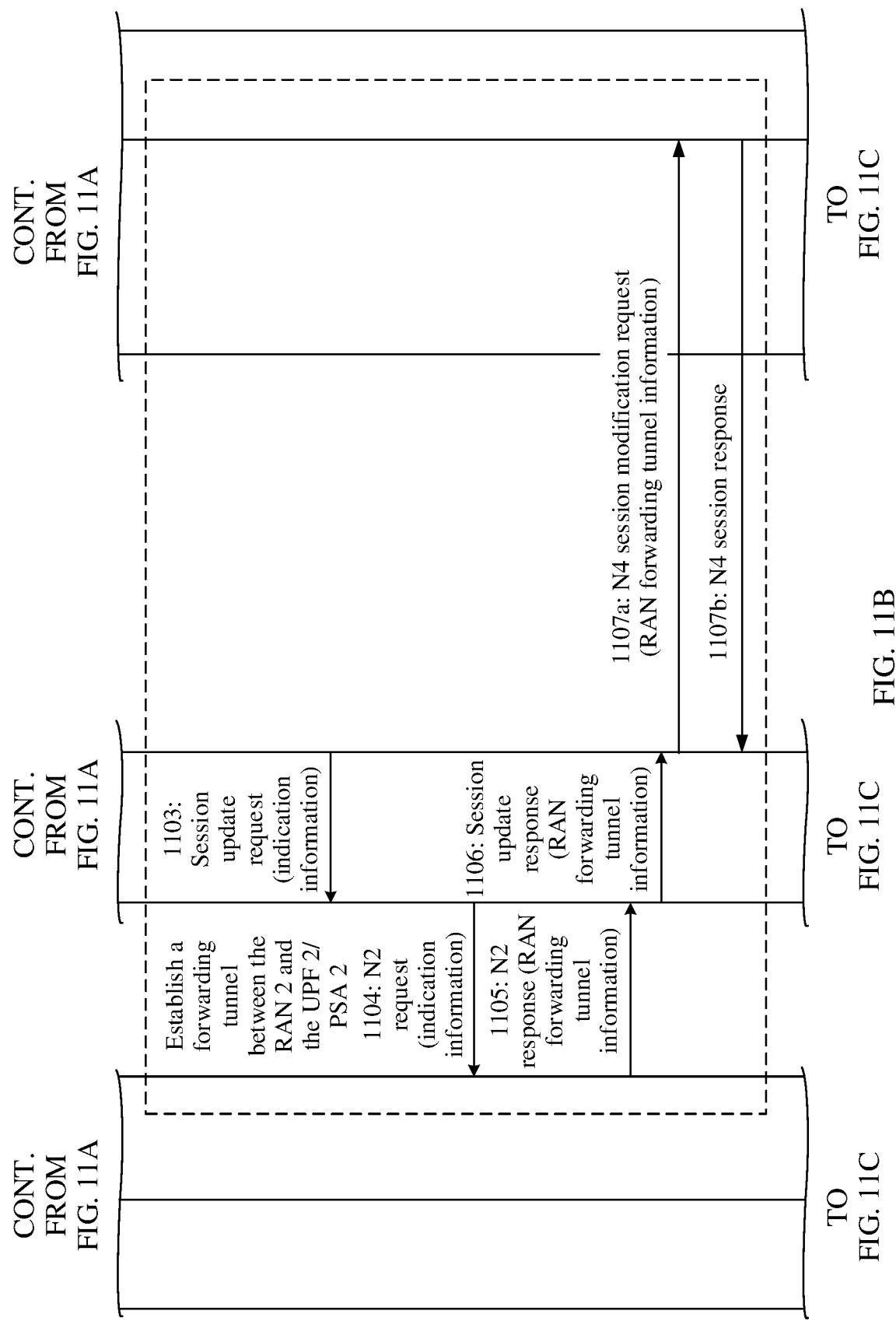

METHOD AND APPARATUS FOR CONTROLLING DISORDER OF DOWNLINK DATA

CROSS-REFERENCE TO RELATED APPLICATIONS

This application is a continuation of U.S. patent application Ser. No. 17/318,814, filed on May 12, 2021, which is a continuation of International Application No. PCT/CN2019/103422, filed on Aug. 29, 2019, which claims priority to Chinese Patent Application No. 201811354479.3, filed on Nov. 14, 2018. All of the afore-mentioned patent applications are hereby incorporated by reference in their entireties.

TECHNICAL FIELD

This application relates to the field of mobile communications technologies, and in particular, to a method for controlling disorder of downlink data and an apparatus thereof.

BACKGROUND

Currently, in some application scenarios, a data transmission path between a terminal and a data network is switched due to reasons such as movement of the terminal. Consequently, a common node (also referred to as a path aggregation network element) on two data transmission paths before and after path switching may simultaneously receive downlink data on the two data transmission paths within a specific time period. In addition, the path aggregation network element cannot distinguish a sending sequence of the downlink data on the two data transmission paths, resulting in a problem of disorder of a downlink data packet.

SUMMARY

This application provides a method for controlling disorder of downlink data and an apparatus thereof, to resolve a problem of disorder of a downlink data packet.

According to a first aspect, this application provides a method for controlling disorder of downlink data. The method includes: A control plane network element determines to perform data transmission path switching. The control plane network element sends indication information to a path aggregation network element. The indication information indicates the path aggregation network element to send, after sending of downlink data of a first data transmission path is completed, downlink data of a second data transmission path. The first data transmission path is a data transmission path before switching, and the second data transmission path is a data transmission path after switching. Based on this solution, the control plane network element may indicate the path aggregation network element to send, after sending of the downlink data of the first data transmission path is completed, the downlink data of the second data transmission path, so that a problem of disorder of a downlink data packet is resolved, thereby improving user experience.

In an embodiment, the indication information indicates the path aggregation network element to send, until an end marker of the first data transmission path is received, a downlink data packet of the second data transmission path. The end marker indicates that transmission of the downlink data of the first data transmission path is completed.

In an embodiment, that a control plane network element determines to perform data transmission path switching includes: The control plane network element determines, in a session anchor change procedure, to switch from a first session anchor to a second session anchor. The first session anchor is located on the first data transmission path, and the second session anchor is located on the second data transmission path.

In an embodiment, wherein the first data transmission path passes through a data network, the first session anchor, and an access network device, and the second data transmission path passes through the data network, the second session anchor, and the access network device, the path aggregation network element is the access network device. Alternatively, wherein the first data transmission path passes through a data network, the first session anchor, and a user plane network element, and the second data transmission path passes through the data network, the second session anchor, and the user plane network element, the path aggregation network element is the user plane network element. Alternatively, wherein the first data transmission path passes through a data network, the first session anchor, and the second session anchor, and the second data transmission path passes through the data network and the second session anchor, the path aggregation network element is the second session anchor.

In another embodiment, that a control plane network element determines to perform data transmission path switching includes: The control plane network element determines, in a user plane connection activation procedure, to switch from a first user plane network element to a second user plane network element. Wherein the first data transmission path passes through a data network, a session anchor, and the first user plane network element, the second data transmission path passes through the data network, the session anchor, and the second user plane network element, and there is a connection between the first user plane network element and the second user plane network element after user plane path switching, the path aggregation network element is the second user plane network element.

According to a second aspect, this application provides a method for controlling disorder of downlink data. The method includes: A path aggregation network element receives indication information from a control plane network element. The path aggregation network element sends, based on the indication information, downlink data of a second data transmission path after sending of downlink data of a first data transmission path is completed. The first data transmission path is a data transmission path before switching, and the second data transmission path is a data transmission path after switching. Based on this solution, the control plane network element may indicate the path aggregation network element to send, after sending of the downlink data of the first data transmission path is completed, the downlink data of the second data transmission path, so that a problem of disorder of a downlink data packet is resolved, thereby improving user experience.

In an embodiment, the indication information indicates the path aggregation network element to send, until an end marker of the first data transmission path is received, a downlink data packet of the second data transmission path. The end marker indicates that transmission of the downlink data of the first data transmission path is completed.

In an embodiment, in a session anchor change procedure, wherein the first data transmission path passes through a data network, a first session anchor, and an access network device, and the second data transmission path passes through the data network, a second session anchor, and the access network device, the path aggregation network element is the access network device. Alternatively, in a session anchor change procedure, wherein the first data transmission path passes through a data network, a first session anchor, and a user plane network element, and the second data transmission path passes through the data network, a second session anchor, and the user plane network element, the path aggregation network element is the user plane network element. Alternatively, in a session anchor change procedure, wherein the first data transmission path passes through a data network, a first session anchor, and a second session anchor, and the second data transmission path passes through the data network and the second session anchor, the path aggregation network element is the second session anchor.

In another embodiment, in a user plane connection activation procedure, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

According to a third aspect, this application provides a method for controlling disorder of downlink data. The method includes: A control plane network element establishes a first user plane connection between a path aggregation network element and an access network device in an access network device switching procedure. The control plane network element establishes a second user plane connection between the path aggregation network element and the access network device in a session anchor change procedure. The first user plane connection is used by the path aggregation network element to send, to the access network device, downlink data received from a first data transmission path, and the second user plane connection is used by the path aggregation network element to send, to the access network device, downlink data received from a second data transmission path. The first data transmission path is a path before session anchor changing in the session anchor change procedure, and the second data transmission path is a path after session anchor changing. Based on this solution, the control plane network element establishes the two user plane connections between the path aggregation network element and the access network device, so that the downlink data of the first data transmission path and the downlink data of the second data transmission path can be separately sent through different user plane connections. In this way, the access network device can distinguish between the downlink data of the first data transmission path and the downlink data of the second data transmission path. Further, the access network device may complete sending of the downlink data of the first data transmission path, and then send the downlink data of the second data transmission path, to resolve the problem of disorder.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In an embodiment, that the control plane network element establishes a second user plane connection between the path aggregation network element and the access network device includes: The control plane network element sends first indication information to the access network device. The first indication information indicates the access network device to allocate tunnel information of the second user plane connection. The control plane network element receives the tunnel information of the second user plane connection from the access network device. The control plane network element sends the tunnel information of the second user plane connection to the path aggregation network element.

In an embodiment, the control plane network element further sends second indication information to the path aggregation network element. The second indication information indicates the path aggregation network element to send, through a tunnel of the second user plane connection, the downlink data of the second data transmission path to the access network device.

According to a fourth aspect, this application provides a method for controlling disorder of downlink data. The method includes: A control plane network element determines, in a user plane connection activation procedure, to switch from a first user plane network element to a second user plane network element. The control plane network element establishes a first user plane connection between the second user plane network element and an access network device, and establishes a second user plane connection between the second user plane network element and the access network device. The first user plane connection is used by a path aggregation network element to send, to the access network device, downlink data received from a first data transmission path, and the second user plane connection is used by the path aggregation network element to send, to the access network device, downlink data received from a second data transmission path. The first data transmission path is a path before user plane network element switching, and the second data transmission path is a path after user plane network element switching. Based on this solution, the control plane network element establishes the two user plane connections between the path aggregation network element and the access network device, so that the downlink data of the first data transmission path and the downlink data of the second data transmission path can be separately sent through different user plane connections. In this way, the access network device can distinguish between the downlink data of the first data transmission path and the downlink data of the second data transmission path. Further, the access network device may complete sending of the downlink data of the first data transmission path, and then send the downlink data of the second data transmission path, to resolve the problem of disorder.

In an embodiment, the first data transmission path passes through a data network, a session anchor, and the first user plane network element, the second data transmission path passes through the data network, the session anchor, and the second user plane network element, and there is a connection between the first user plane network element and the second user plane network element.

In an embodiment, that the control plane network element establishes a second user plane connection between the second user plane network element and the access network device includes: The control plane network element sends first indication information to the access network device. The first indication information indicates the access network device to allocate tunnel information of the second user plane connection. The control plane network element receives the tunnel information of the second user plane connection from the access network device. The control plane network element sends the tunnel information of the second user plane connection to the second user plane network element.

In an embodiment, the control plane network element further sends second indication information to the second user plane network element. The second indication information indicates the second user plane network element to send, through the second user plane connection, the downlink data of the second data transmission path to the access network device.

According to a fifth aspect, this application provides a method for controlling disorder of downlink data. The method includes: A path aggregation network element receives downlink data of a first data transmission path and downlink data of a second data transmission path. The path aggregation network element sends the downlink data of the first data transmission path to an access network device through a first user plane connection between the path aggregation network element and the access network device. The path aggregation network element sends the downlink data of the second data transmission path to the access network device through a second user plane connection between the path aggregation network element and the access network device. Based on this solution, the two user plane connections are established between the path aggregation network element and the access network device, so that the downlink data of the first data transmission path and the downlink data of the second data transmission path can be separately sent through different user plane connections. In this way, the access network device can distinguish between the downlink data of the first data transmission path and the downlink data of the second data transmission path. Further, the access network device may complete sending of the downlink data of the first data transmission path, and then send the downlink data of the second data transmission path, to resolve the problem of disorder.

In an embodiment, before receiving the downlink data of the first data transmission path and the downlink data of the second data transmission path, the path aggregation network element further receives indication information from a control plane network element. The indication information indicates the path aggregation network element to send, through the second user plane connection between the path aggregation network element and the access network device, the downlink data of the second data transmission path to the access network device.

In an embodiment, the path aggregation network element receives tunnel information, of the second user plane connection of the access network device, sent by the control plane network element.

In an embodiment, the first data transmission path is a path before session anchor changing in a session anchor change procedure, and the second data transmission path is a path after session anchor changing.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In another embodiment, the first data transmission path is a path before user plane path switching in a user plane connection activation procedure, and the second data transmission path is a path after user plane path switching in the user plane connection activation procedure.

In an embodiment, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

According to a sixth aspect, this application provides a method for controlling disorder of downlink data. The method includes: An access network device receives downlink data, of a first data transmission path, sent by a path aggregation network element through a first user plane connection between the path aggregation network element and the access network device, and receives downlink data, of a second data transmission path, sent by the path aggregation network element through a second user plane connection between the path aggregation network element and the access network device. The first data transmission path is a data transmission path before path switching, and the second data transmission path is a data transmission path after path switching. The access network device sends the downlink data of the second data transmission path after sending of the downlink data of the first data transmission path is completed. Based on this solution, the two user plane connections are established between the path aggregation network element and the access network device, so that the downlink data of the first data transmission path and the downlink data of the second data transmission path can be separately sent through different user plane connections. In this way, the access network device can distinguish between the downlink data of the first data transmission path and the downlink data of the second data transmission path. Further, the access network device may complete sending of the downlink data of the first data transmission path, and then send the downlink data of the second data transmission path, to resolve the problem of disorder.

In an embodiment, the access network device receives indication information sent by a control plane network element. The indication information indicates the access network device to allocate tunnel information of the second user plane connection. The access network device allocates the tunnel information of the second user plane connection, and sends the tunnel information of the second user plane connection to the control plane network element.

In an embodiment, the first data transmission path is a path before session anchor changing in a session anchor change procedure, and the second data transmission path is a path after session anchor changing.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In another embodiment, the first data transmission path is a path before user plane path switching in a user plane connection activation procedure, and the second data transmission path is a path after user plane path switching in the user plane connection activation procedure.

In an embodiment, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

According to a seventh aspect, this application provides an apparatus. The apparatus may be a control plane network element, a path aggregation network element, an access network device, or a chip. The apparatus has a function of implementing any one of the first aspect or the embodiments of the first aspect, or any one of the second aspect or the embodiments of the second aspect, or any one of the third aspect or the embodiments of the third aspect, or any one of the fourth aspect or the embodiments of the fourth aspect, or any one of the fifth aspect or the embodiments of the fifth aspect, or any one of the sixth aspect or the embodiments of the sixth aspect. The function may be implemented by hardware, or may be implemented by hardware executing corresponding software. The hardware or the software includes one or more modules corresponding to the function.

According to an eighth aspect, an apparatus is provided. The apparatus includes a processor and a memory. The memory is configured to store computer-executable instructions. When the apparatus runs, the processor executes the computer-executable instructions stored in the memory, so that the apparatus performs the method according to any one of the first aspect or the embodiments of the first aspect, performs the method according to any one of the second aspect or the embodiments of the second aspect, performs the method according to any one of the third aspect or the embodiments of the third aspect, performs the method according to any one of the fourth aspect or the embodiments of the fourth aspect, performs the method according to any one of the fifth aspect or the embodiments of the fifth aspect, or performs the method according to any one of the sixth aspect or the embodiments of the sixth aspect.

According to a ninth aspect, this application further provides a computer-readable storage medium. The computer-readable storage medium stores instructions. When the instructions are run on a computer, the computer is enabled to perform the method according to any one of the first aspect or the embodiments of the first aspect, perform the method according to any one of the second aspect or the embodiments of the second aspect, perform the method according to any one of the third aspect or the embodiments of the third aspect, perform the method according to any one of the fourth aspect or the embodiments of the fourth aspect, perform the method according to any one of the fifth aspect or the embodiments of the fifth aspect, or perform the method according to any one of the sixth aspect or the embodiments of the sixth aspect.

According to a tenth aspect, this application further provides a computer program product including instructions. When the computer program product runs on a computer, the computer is enabled to perform the method according to any one of the first aspect or the embodiments of the first aspect, perform the method according to any one of the second aspect or the embodiments of the second aspect, perform the method according to any one of the third aspect or the embodiments of the third aspect, perform the method according to any one of the fourth aspect or the embodiments of the fourth aspect, perform the method according to any one of the fifth aspect or the embodiments of the fifth aspect, or perform the method according to any one of the sixth aspect or the embodiments of the sixth aspect.

According to an eleventh aspect, this application further provides a system. The system includes the control plane network element in any one of the first aspect or the embodiments of the first aspect and the path aggregation network element in any one of the second aspect or the embodiments of the second aspect.

According to a twelfth aspect, this application further provides a system. The system includes the control plane network element in any one of the third aspect or the embodiments of the third aspect, the path aggregation network element in any one of the fifth aspect or the embodiments of the fifth aspect, and the access network device in any one of the sixth aspect or the embodiments of the sixth aspect.

According to a thirteenth aspect, this application further provides a system. The system includes the control plane network element in any one of the fourth aspect or the embodiments of the fourth aspect, the path aggregation network element in any one of the fifth aspect or the embodiments of the fifth aspect, and the access network device in any one of the sixth aspect or the embodiments of the sixth aspect.

BRIEF DESCRIPTION OF DRAWINGS

FIG. 2(*a*) is a schematic diagram of another PSA change procedure according to this application;

FIG. 2(*b*) is a schematic diagram of another PSA change procedure according to this application;

FIG. 2(*c*) is a schematic diagram of another PSA change procedure according to this application;

FIG. 9A and FIG. 9B is a flowchart of another method for controlling disorder of downlink data according to this application;

FIG. 10A, FIG. 10B, and FIG. 10C is a flowchart of another method for controlling disorder of downlink data according to this application;

FIG. 11A, FIG. 11B, and FIG. 11C is a flowchart of another method for controlling disorder of downlink data according to this application;

DESCRIPTION OF EMBODIMENTS

To make the objectives, technical solutions, and advantages of this application clearer, the following further describes this application in detail with reference to the accompanying drawings. A specific operation method in a method embodiment may also be used in an apparatus embodiment or a system embodiment. In the descriptions of this application, unless otherwise specified, "a plurality of" means two or more than two.

Figure 1:
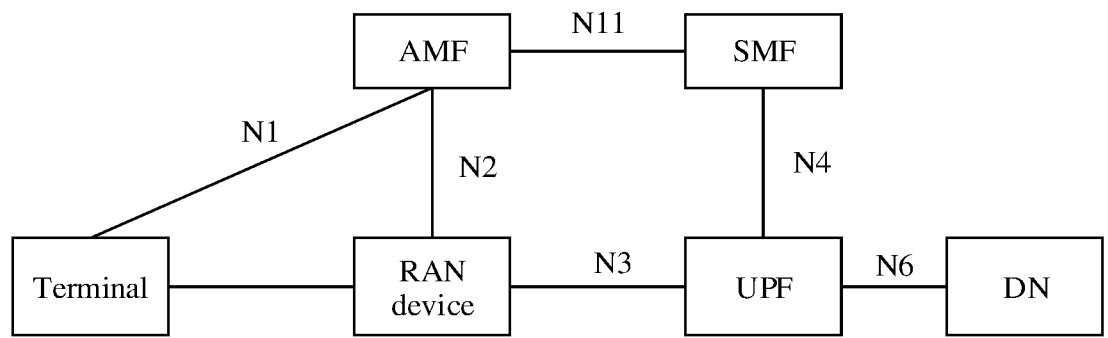
FIG. 1 is a schematic diagram of a possible network architecture according to this application.

FIG. 1 is a possible network architecture to which this application is applicable. The network architecture includes an access network device (where an example in which the access network device is a radio access network (RAN) device is used in the figure), a user plane network element (where an example in which the user plane network element is a user plane function (UPF) network element is used in the figure), a mobility management network element (where an example in which the mobility management network element is an access and mobility management function (AMF) network element is used in the figure), and a session management network element (where an example in which the session management network element is a session management function (SMF) network element is used in the figure). An interface between a terminal and the AMF network element may be referred to as an N1 interface, an interface between the AMF network element and the RAN device may be referred to as an N2 interface, an interface between the RAN device and the UPF network element may be referred to as an N3 interface, an interface between the SMF network element and the UPF network element may be referred to as an N4 interface, an interface between the AMF network element and the SMF network element may be referred to as an N11 interface, and an interface between the UPF network element and a data network (DN) may be referred to as an N6 interface. Certainly, with evolution of a communications standard, names of the foregoing network elements may change, and names of the interfaces between the network elements may also change.

The user plane network element is mainly responsible for processing a user packet. The processing is, for example, forwarding, charging, or lawful interception. In 5th generation (5G) communication, the user plane network element may be the UPF network element shown in FIG. 1. In future communication such as 6th generation (6G) communication, the user plane network element may still be a UPF network element, or may have another name. This is not limited in this application.

The session management network element is mainly configured to perform session management in a mobile network, for example, session establishment, session modification, and session release. Specific functions include allocating an internet protocol (IP) address to the terminal, selecting a user plane network element that provides a packet forwarding function, and the like. In the 5G communication, the session management network element may be the SMF network element shown in FIG. 1. In the future communication such as the 6G communication, the session management network element may still be an SMF network element, or may have another name. This is not limited in this application.

In this application, the session management network element may also be referred to as a control plane network element.

The mobility management network element is mainly configured for registration, mobility management, and a tracking area update procedure for the terminal in the mobile network. The mobility management network element terminates a non-access stratum (NAS) message, completes registration management, connection management, reachability management, tracking area list (TA list) allocation, mobility management, and the like, and transparently routes a session management (SM) message to the session management network element. In the 5G communication, the mobility management network element may be the AMF network element shown in FIG. 1. In the future communication such as the 6G communication, the mobility management network element may still be an AMF network element, or may have another name. This is not limited in this application.

The data network (DN) is an operator network that provides a data transmission service for a user, for example, an IP multimedia service (IMS) or the internet. The terminal accesses the data network by establishing a session (protocol data unit (PDU) session) between the terminal, the access network device, the user plane network element, and the data network.

The terminal is a device having a wireless transceiver function. The terminal may be deployed on land, and includes an indoor device, an outdoor device, a hand-held device, or a vehicle-mounted device. The terminal may alternatively be deployed on a water surface (for example, on a ship), or may be deployed in air (for example, in an aircraft, a balloon, or a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, or a wireless terminal in a smart home, and may further include user equipment (UE) and the like. Alternatively, the terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. The terminal sometimes may also be referred to as a terminal device, UE, an access terminal device, a vehicle-mounted terminal, an industrial control terminal, a UE unit, a UE station, a mobile station, a remote station, a remote terminal device, a mobile device, a UE terminal device, a wireless communications device, a UE agent, a UE apparatus, or the like. The terminal may be fixed or movable. This is not limited in this embodiment of this application.

The access network device may also be referred to as the RAN device, and is a device that provides a wireless communication function for the terminal. For example, the access network device includes but is not limited to: a next-generation base station (g nodeB, gNB) in 5G, an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a transmission point (TRP), a transmission point (TP), a mobile switching center, and the like. Alternatively, the access network device may be a radio controller, a centralized unit (CU), and/or a distributed unit (DU) in a cloud radio access network (CRAN) scenario, or the access network device may be a relay station, an access point, a vehicle-mounted device, a wearable device, a network device in a future 5G network, a network device in a future evolved PLMN network, or the like. The terminal may communicate with a plurality of access network devices that use different technologies. For example, the terminal may communicate with an access network device that supports a long term evolution (LTE) network, or may communicate with an access network device that supports a 5G network, or may support dual connectivity to an access network device in an LTE network and an access network device in a 5G network. This is not limited in the embodiments of this application.

It may be understood that the foregoing functions may be network elements in a hardware device, software functions running on dedicated hardware, or virtualized functions instantiated on a platform (for example, a cloud platform).

For ease of description, in this application, an example in which a user plane network element is a UPF network element, an access network device is a RAN device, a session management network element is an SMF network element, a mobility management network element is an AMF network element, and a terminal is UE is used for subsequent description. Further, the UPF network element is referred to as a UPF for short, the RAN device is referred to as a RAN for short, the SMF network element is referred to as an SMF for short, and the AMF network element is referred to as an AMF for short. To be specific, in subsequent descriptions of this application, each UPF may be replaced with a user plane network element, each RAN may be replaced with an access network device, each SMF may be replaced with an SMF, each AMF network element may be replaced with an AMF, and each UE may be replaced with a terminal.

The following describes some terms and backgrounds in this application, to help understand content of this application.

1. UE Status

The UE status includes an idle (IDLE) state or a connected (CONNECTED) state. Certainly, the UE status may alternatively include another state. This is not limited in this application.

When the UE is in the idle state, from a perspective of a user plane, air interface connections corresponding to all sessions of the UE, namely, a wireless connection between the UE and the RAN and an N3 connection between the RAN and the UPF, are all released; or from a perspective of a control plane, an N2 signaling connection between the RAN and the AMF is released, and an N1 connection between the UE and the AMF is released.

When the UE is in the connected state, from a perspective of a user plane, there is a user plane connection between the UE and the RAN, and there is a user plane connection between the RAN and the UPF; or from a perspective of a control plane, there is an N1 connection between the UE and the AMF, and there is an N2 connection between the RAN and the AMF.

2. PDU Session Anchor (PSA) Change Procedure

In this application, a PSA may also be referred to as a session anchor. For example, in specific application, the PSA may be a UPF network element having an IP anchor function, or may be a UPF network element having a service anchor function. The IP anchor function means that when an anchor point of a UE IP remains unchanged, the UE IP remains unchanged. The service anchor function means that service continuity is not affected when the anchor point remains unchanged.

When the PSA changes, the IP changes. The service anchor function means that the service continuity is affected when the PSA changes.

PSA changing may also be referred to as PSA switching, session anchor switching, or anchor redirection. The PSA changing indicates that a PSA on a data transmission path changes or is switched.

Figure 2:
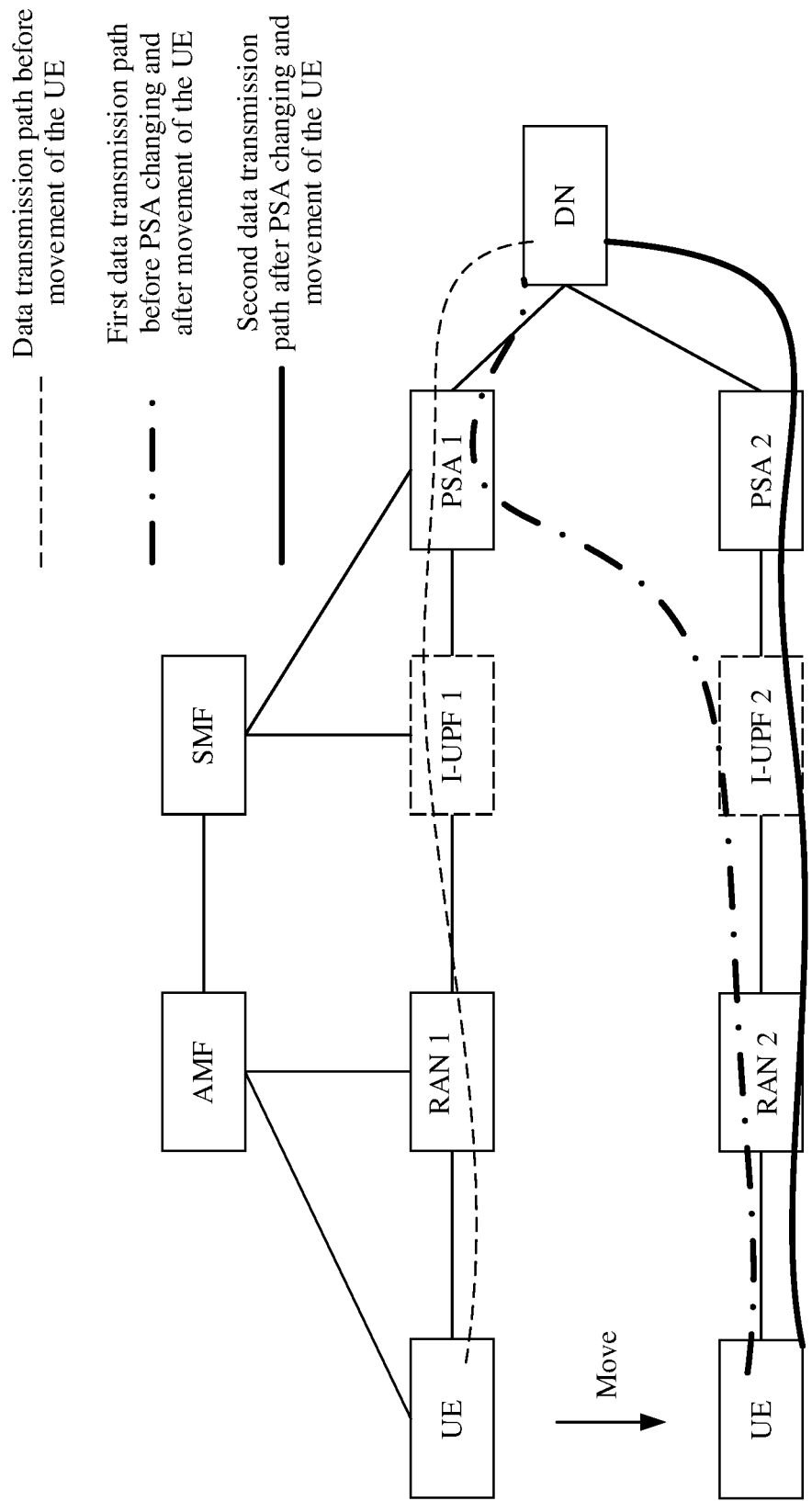
FIG. 2 is a schematic diagram of a PSA change procedure according to this application.

FIG. 2 is a schematic diagram of a PSA change procedure. Before moving, UE accesses a DN through a RAN 1, an I-UPF 1 (where the I-UPF 1 may not be located on a path), and a PSA 1. To be specific, as shown by a thin dashed line in FIG. 2, a data transmission path (or referred to as a user plane path) of the UE passes through the UE, the RAN 1, (the I-UPF 1), the PSA 1, and the DN.

After moving, the UE accesses the DN through a RAN 2, an I-UPF 2 (where the I-UPF 2 may be not located on a path), and the PSA 1. To be specific, as shown by a thick dashed line in FIG. 2, a data transmission path (or referred to as a user plane path) of the UE passes through the UE, the RAN 2, (the I-UPF 2), the PSA 1, and the DN. In this application, the data transmission path is also referred to as a first data transmission path, namely, a data transmission path before PSA changing in a PSA change procedure.

In this case, because the path is not optimal, an SMF may determine to perform anchor redirection, that is, reselect a new anchor PSA 2 and change the data transmission path. As shown by a thick solid line in FIG. 2, a changed data transmission path (or referred to as a user plane path) of the UE passes through the UE, the RAN 2, (the I-UPF 2), the PSA 2, and the DN. In this application, the data transmission path is also referred to as a second data transmission path, namely, a data transmission path after PSA changing in the PSA change procedure.

Based on the foregoing background, after PSA changing is competed, an application server (AS) in the DN may start to send downlink data (or a downlink packet) to the UE on the second data transmission path. When the application server sends the downlink data to the UE on the second data transmission path, there is possibility that downlink data on the first data transmission path has not been sent to the UE. In addition, because the first data transmission path is not optimal (for example, the path is relatively long), there is possibility that the downlink data on the second data transmission path arrives at the RAN 2 or the I-UPF 2 (when the I-UPF 2 is located on the path) before the downlink data on the first data transmission path. The RAN 2 or the I-UPF 2 cannot distinguish which downlink data is sent first and which downlink data is sent later, resulting in disorder of downlink data. Consequently, user experience may be reduced.

Therefore, the foregoing problem of disorder of a downlink data packet in the PSA change procedure shown in FIG. 2 is a problem to be resolved in this application.

It should be noted that an I-UPF in this application is an intermediate UPF.

Further, in this application, the PSA change procedure shown in FIG. 2 may be further divided into the following three specific application scenarios.

Application scenario 1: After the UE moves, no I-UPF is located on the data transmission path, that is, a RAN is simultaneously connected to a plurality of PSAs.

Figure 2A:
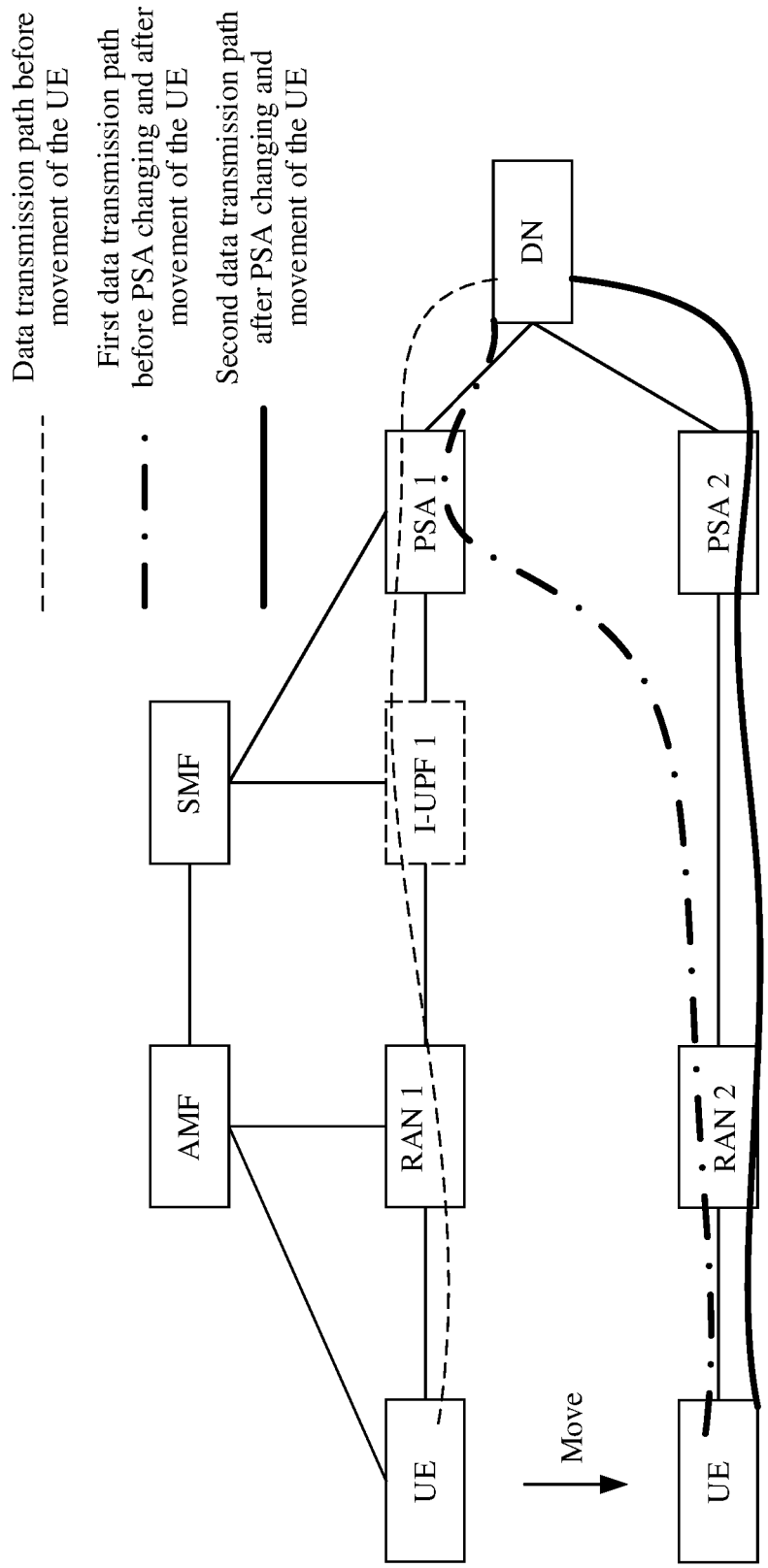

FIG. 2(a) is a schematic diagram of another PSA change procedure according to this application. After UE moves, a data transmission path before PSA changing, namely, a first data transmission path, passes through the UE, a RAN 2, a PSA 1, and a DN, and a data transmission path after PSA changing, namely, a second data transmission path, passes through the UE, the RAN 2, a PSA 2, and the DN.

In other words, after the UE moves, no I-UPF is located on the first data transmission path and the second data transmission path.

Application scenario 2: After the UE moves, an I-UPF is located on a path, and the I-UPF cannot serve as an anchor after PSA changing.

Figure 2B:
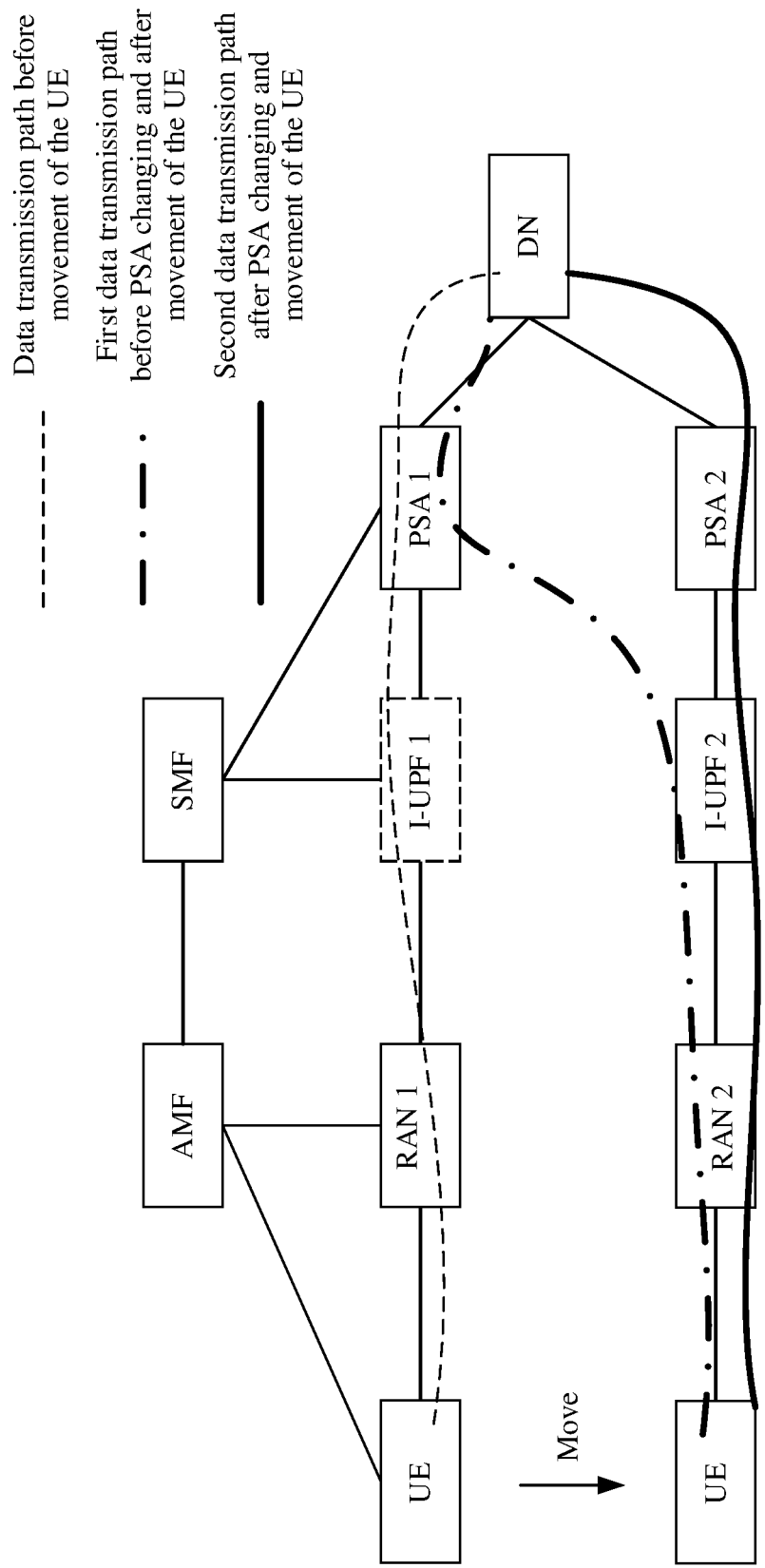

FIG. 2(b) is a schematic diagram of another PSA change procedure according to this application. After UE moves, a data transmission path before PSA changing, namely, a first data transmission path, passes through the UE, a RAN 2, an I-UPF 2, a PSA 1, and a DN, and a data transmission path after PSA changing, namely, a second data transmission path, passes through the UE, the RAN 2, the I-UPF 2, a PSA 2, and the DN.

In other words, after the UE moves, a same I-UPF (namely, the I-UPF 2 in the figure) is located on the first data transmission path and the second data transmission path, and the I-UPF and the PSA 2 are different nodes.

Application scenario 3: After the UE moves, an I-UPF is located on a path, and the I-UPF can serve as an anchor after PSA changing.

Figure 2C:
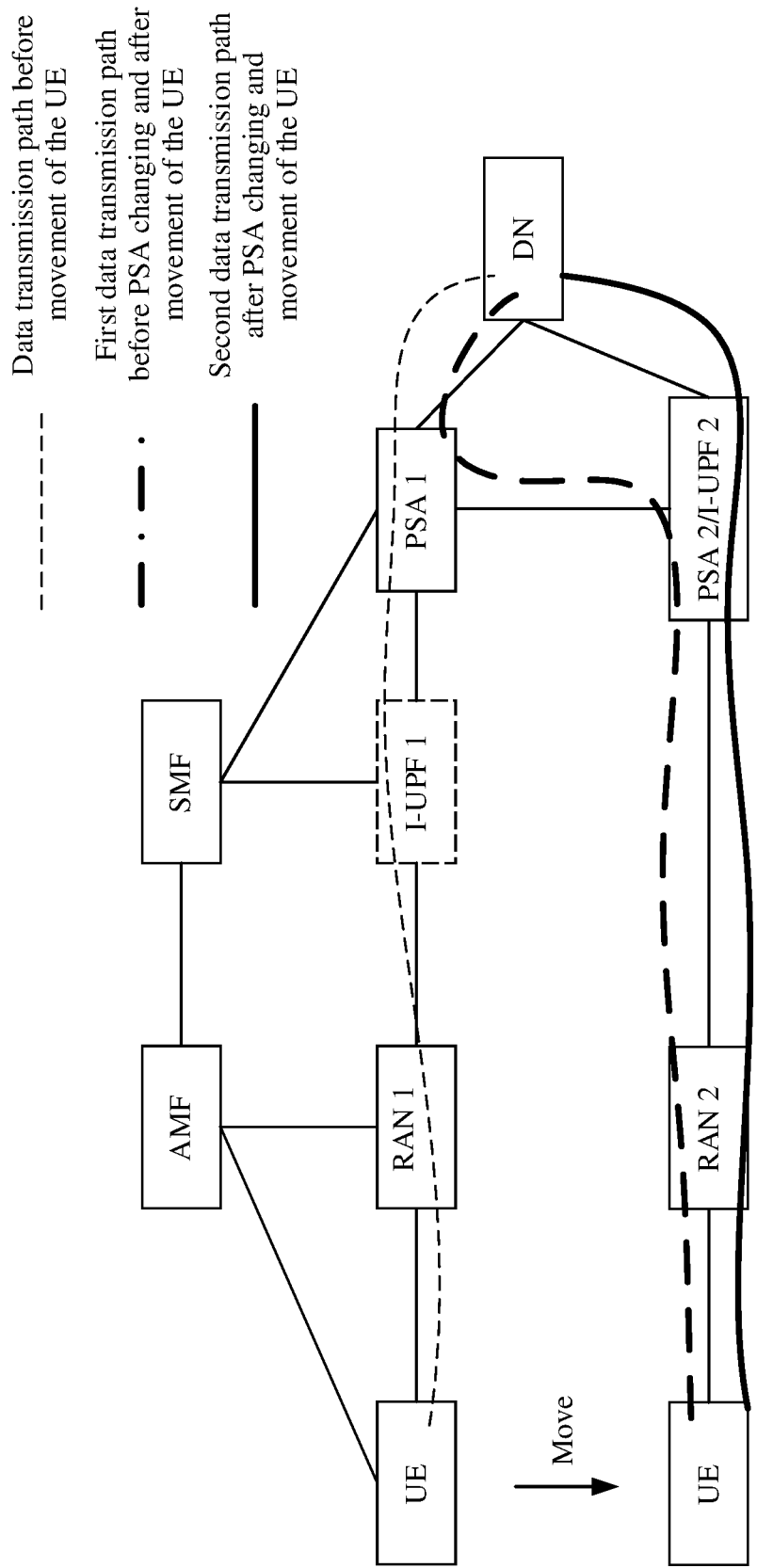

FIG. 2(c) is a schematic diagram of another PSA change procedure according to this application. After UE moves, a data transmission path before PSA changing, namely, a first data transmission path, passes through the UE, a RAN 2, an I-UPF 2/a PSA 2, a PSA 1, and a DN. There is a user plane connection between the PSA 1 and the I-UPF 2/PSA 2. A data transmission path after PSA changing, namely, a second data transmission path, passes through the UE, the RAN 2, the I-UPF 2/PSA 2, and the DN.

In other words, after the UE moves, a same I-UPF (namely, the I-UPF 2 in the figure) is located on the first data transmission path and the second data transmission path, and the I-UPF 2 and the PSA 2 are a same node. In other words, the I-UPF 2 can serve as either an I-UPF or a PSA.

3. Downlink-Triggered User Plane Connection Activation Procedure

Figure 3:
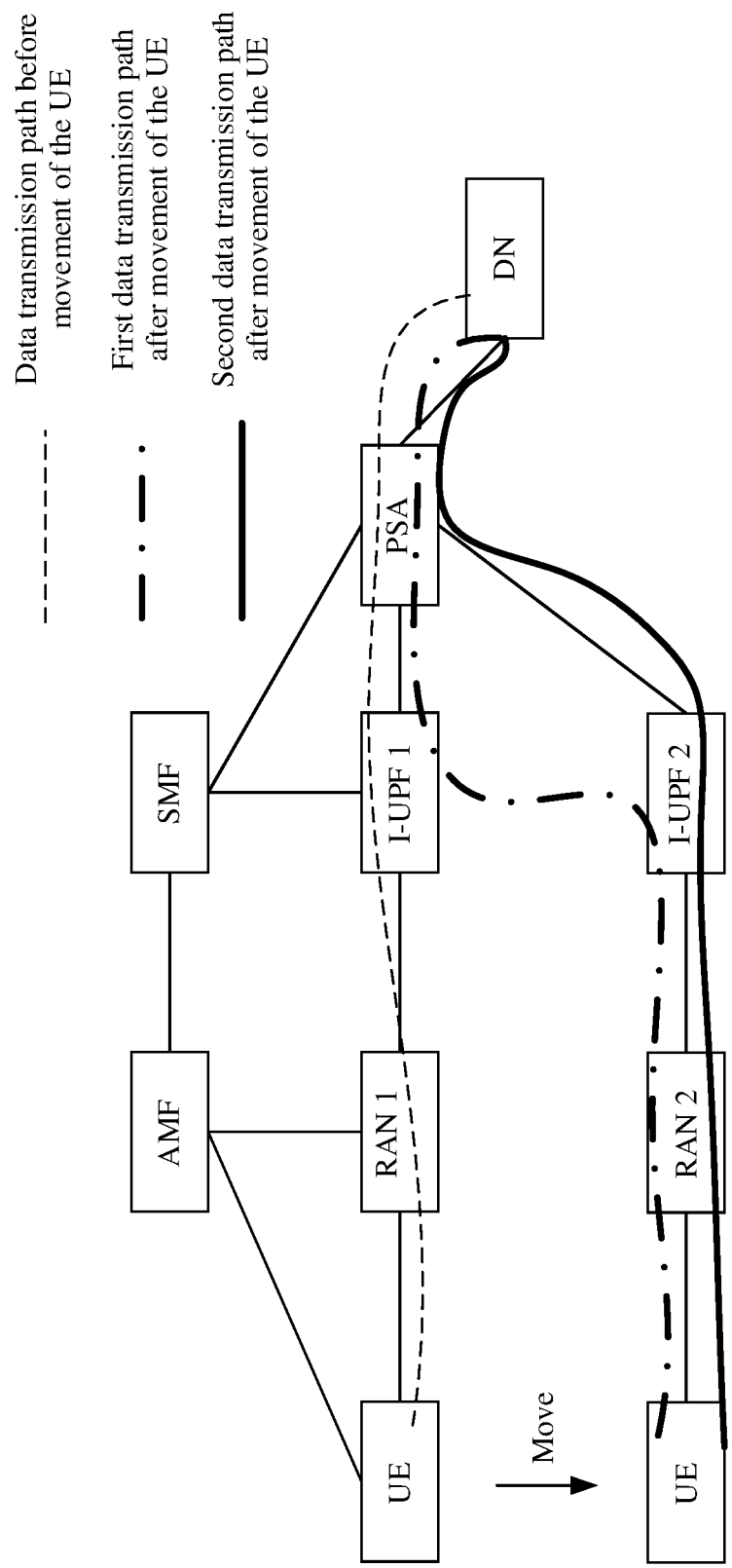
FIG. 3 is a schematic diagram of an application scenario of a downlink-triggered user plane connection activation procedure according to this application.

FIG. 3 is a schematic diagram of an application scenario of a downlink-triggered user plane connection activation procedure.

As shown by a thin dashed line in FIG. 3, a data transmission path (or referred to as a user plane connection) corresponding to a session 1 in UE passes through the UE, a RAN 1, an I-UPF 1, a PSA, and a DN. When the UE is in an idle state, or when the UE is in a connected state but the user plane connection corresponding to the session 1 is deactivated, if there is downlink data in the session 1, that is, there is downlink data to be sent from a DN to the UE, the downlink data cannot be sent to the UE. Specifically, the DN sends the downlink data to the PSA, and then the PSA sends the downlink data to the I-UPF 1. The I-UPF 1 cannot send the downlink data to the RAN 1. In this case, on one hand, the I-UPF 1 buffers the downlink data, or sends the downlink data to an SMF, and the SMF buffers the downlink data. On the other hand, the user plane connection activation procedure is triggered. For example, when the UE is in the idle state, the user plane connection activation procedure may be a paging procedure. When the UE is in the connected state but the user plane connection corresponding to the session 1 is deactivated, the user plane connection activation procedure is a procedure for activating the user plane connection corresponding to the session 1.

Further, an application scenario considered in this application is that the UE moves before the downlink data triggers user plane connection activation. As shown in FIG. 3, it is assumed that when transmission of the downlink data starts, the UE has moved from coverage of the RAN 1 to coverage of a RAN 2, and the RAN 2 cannot be directly connected to the I-UPF 1 and may be connected to the I-UPF 1 through an I-UPF 2. Therefore, in the user plane connection activation procedure, as shown by a thick solid line in FIG. 3, an activated user plane connection passes through the UE, the RAN 2, the I-UPF 2, the PSA, and the DN. In this application, the user plane connection is also referred to as a second data transmission path. In addition, if downlink data that is not sent to the UE is buffered in the I-UPF 1 before user plane connection activation, a forwarding tunnel may be established between the I-UPF 1 and the I-UPF 2 after user plane connection activation, to transmit the buffered downlink data. As shown by a thick dashed line in FIG. 3, after user plane connection activation, a data transmission path (or referred to as a user plane connection) used to transmit the downlink data buffered in the I-UPF 1 passes through the DN, the PSA, the I-UPF 1, the I-UPF 2, the RAN 2, and the UE. There is a user plane connection between the I-UPF 1 and the I-UPF 2. In this application, the data transmission path is also referred to as a first data transmission path. It should be noted that, if the downlink data that is not sent to the UE is buffered on the SMF before user plane connection activation, the SMF may send the downlink data to the I-UPF 2 after user plane connection activation.

Based on the foregoing background, after user plane connection activation, an application server in the DN may start to send the downlink data (or a downlink packet) to the UE on the second data transmission path. When the application server sends the downlink data to the UE on the second data transmission path, there is possibility that downlink data on the first data transmission path has not been sent to the UE. For example, the downlink data is buffered in the I-UPF 1. Therefore, the downlink data needs to be transmitted to the UE through the first data transmission path. In this case, the I-UPF 2 receives downlink data in two directions: (1) downlink data sent by the PSA on the second data transmission path; and (2) buffered downlink data sent by the I-UPF 1 on the first data transmission path.

As a result, the I-UPF 2 cannot distinguish which downlink data is sent first and which downlink data is sent later, resulting in disorder of downlink data. Consequently, user experience may be reduced.

Therefore, the foregoing problem of disorder of a downlink data packet in the user plane connection activation procedure shown in FIG. 3 is also a problem to be resolved in this application.

For the procedures shown in FIG. 2 and FIG. 3, generally, in the following cases, a problem that downlink data needs to be sorted is relatively easy to occur.

Case 1: Continuous delivery of downlink data does not depend on triggering/response of uplink data, for example, there is only a service of a downlink (mobile terminated only, MT-only) type.

When continuous delivery of the downlink data depends on triggering/response of the uplink data, if the DN does not receive uplink data sent by the UE, the DN does not continuously send the downlink data. Therefore, the downlink data is not sent on the second data transmission path (namely, a newly established user plane connection) shown in FIG. 2 or FIG. 3. In this way, the I-UPF 2 does not receive the downlink data of the two data transmission paths, so that the problem of disorder does not occur. On the contrary, if continuous delivery of the downlink data does not depend on triggering/response of the uplink data, the downlink data may be sent after establishment of a new user plane connection is completed, resulting in a problem of disorder on the I-UPF 2. Therefore, this application is applicable to a scenario in which continuous delivery of the downlink data does not depend on triggering/response of the uplink data.

For example, in a specific example, a session of an ethernet type may be used for transmitting only downlink data, for example, an event control signal. When an event occurs, the downlink data is sent to the UE.

Case 2: A large amount of downlink data is buffered, and the I-UPF 2 may fail to send the buffered downlink data to the UE at one time.

Because a node on the first data transmission path, such as the PSA 1 in FIG. 2 or the I-UPF 1 in FIG. 3, buffers a relatively large amount of downlink data of the first data transmission path, after receiving the downlink data of the first data transmission path, the UE sends uplink data to the DN. After the DN receives the uplink data, since the second data transmission path has been established, the DN continues to send the downlink data to the UE on the second data transmission path. In addition, there is still downlink data to be sent to the UE on the first data transmission path. Consequently, the I-UPF 2 in FIG. 2 or FIG. 3 receives both the downlink data (namely, old downlink data) of the first data transmission path and the downlink data (namely, new downlink data) of the second data transmission path, resulting in a problem of disorder on the I-UPF 2. Therefore, this application is also applicable to a scenario in which a large amount of downlink data is buffered, and the I-UPF 2 fails to send the buffered downlink data to the UE at one time.

It should be noted that the foregoing case 1 and case 2 are merely examples. This application is not limited to the foregoing two cases. This application is also applicable to another case in which the problem of disorder occurs in the procedure shown in FIG. 2 or FIG. 3.

For the foregoing problem of disorder of downlink data in the PSA change procedure or the downlink-triggered user plane connection activation procedure, this application provides different solutions with reference to different application scenarios. Details are described below.

For ease of description, in this application, an example in which the control plane network element is an SMF is used to describe the embodiments of this application. This application is also applicable to a scenario in which the control plane network element is another network element.

In this application, in the PSA change procedure, a PSA, an I-UPF, and a RAN on a first data transmission path before PSA changing may be respectively referred to as a first PSA, (a second UPF), a second RAN, or may be referred to as a PSA 1, (an I-UPF 2), and a RAN 2. A PSA, a UPF, and a RAN on a second data transmission path after PSA changing may be respectively referred to as a second PSA, (a second UPF), and a second RAN, or may be referred to as a PSA 2, (an I-UPF 2), and a RAN 2.

In this application, in the user plane connection activation procedure, an I-UPF and a RAN on a first data transmission path before UPF changing may be respectively referred to as a first UPF and a second RAN, or may be referred to as an I-UPF 1 and a RAN 2. An I-UPF and a RAN on a second data transmission path after UPF changing may be respectively referred to as a second UPF and a second RAN, or may be referred to as an I-UPF 2 and a RAN 2.

Figure 4:
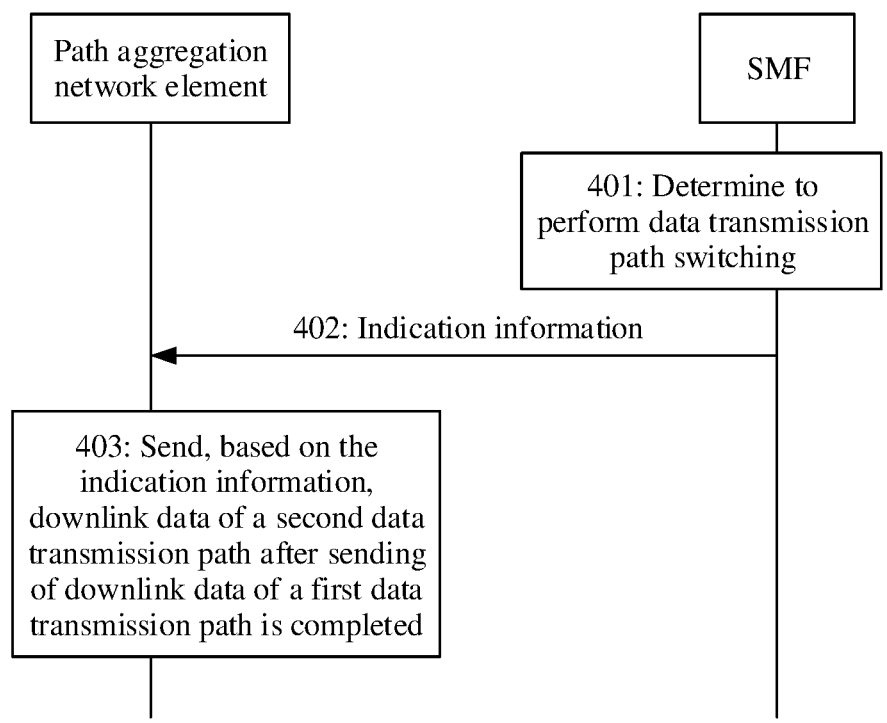
FIG. 4 is a flowchart of a method for controlling disorder of downlink data according to this application.

FIG. 4 shows a method for controlling disorder of downlink data according to this application. In the method, an idea for resolving the foregoing problem of disorder of downlink data is as follows: An SMF indicates a path aggregation network element to: send old data (namely, downlink data of a first data transmission path), and then send, after sending of the old data is completed, new data (namely, downlink data of a second data transmission path), thereby resolving the problem of disorder.

The path aggregation network element is a network node that aggregates the first data transmission path and the second data transmission path.

This embodiment may be applied to the foregoing three application scenarios in the PSA change procedure, that is, may resolve the problem of disorder of downlink data in the application scenarios shown in FIG. 2(a), FIG. 2(b), and FIG. 2(c). For FIG. 2(a), the path aggregation network element is a RAN 2. For FIG. 2(b), the path aggregation network element is an I-UPF 2. For FIG. 2(c), the path aggregation network element is a PSA 2/an I-UPF 2 (where the I-UPF 2 and the PSA 2 herein are a same node, that is, the I-UPF 2 may serve as a UPF or a PSA).

This embodiment may also be applied to an application scenario in a user plane connection activation procedure, that is, may resolve the problem of disorder of downlink data in the application scenario shown in FIG. 3. For FIG. 3, the path aggregation network element is an I-UPF 2.

The method includes the following steps.

Step 401: The SMF determines to perform data transmission path switching.

The data transmission path switching may be data transmission path switching in the PSA change procedure. To be specific, in the PSA change procedure, the SMF determines to switch from a PSA 1 to a PSA 2. The PSA 1 is located on the first data transmission path, and the PSA 2 is located on the second data transmission path.

The data transmission path switching may alternatively be data transmission path switching in the foregoing user plane connection activation procedure. The SMF determines to switch from an I-UPF 1 to an I-UPF 2. The first data transmission path passes through a DN, a PSA, and the I-UPF 1, the second data transmission path passes through the DN, the PSA, and the I-UPF 2, and there is a connection between the I-UPF 1 and the I-UPF 2 after user plane path switching In an embodiment, the SMF may determine, based on location information of UE, to perform data transmission path switching. That is, when the UE moves, the UE may determine, based on a latest location of the UE, that data transmission path switching needs to be performed.

Step 402: The SMF sends indication information to the path aggregation network element. Correspondingly, the path aggregation network element may receive the indication information.

The indication information indicates the path aggregation network element to send, after sending of downlink data of the first data transmission path is completed, downlink data of the second data transmission path. The first data transmission path is a data transmission path before switching, and the second data transmission path is a data transmission path after switching. Another description of the indication information is that the indication information indicates the path aggregation network element to associate the first data transmission path with the second data transmission path. In this way, after sending of the downlink data of the first data transmission path is completed, the path aggregation network element sends the downlink data of the second data transmission path.

In an embodiment, the indication information indicates the path aggregation network element to send, until an end marker of the first data transmission path is received, a downlink data packet of the second data transmission path. The end marker indicates that transmission of the downlink data of the first data transmission path is completed. That is, the path aggregation network element may receive both the downlink data of the first data transmission path and the downlink data of the second data transmission path, and the path aggregation network element buffers the downlink data of the second data transmission path. If the downlink data of the first data transmission path does not include the end marker, the path aggregation network element sends the downlink data of the first data transmission path to the UE. If the downlink data of the first data transmission path includes the end marker, it indicates that transmission of the downlink data of the first data transmission path is completed. In this case, the path aggregation network element obtains the downlink data of the second data transmission path from a buffer, and sends the downlink data of the second data transmission path to the UE. After sending of the buffered downlink data of the second data transmission path is completed, the path aggregation network element may subsequently send the downlink data of the second data transmission path in a normal manner. That is, when the downlink data, of the first data transmission path, received by the path aggregation network element is the end marker, the path aggregation network element starts to send the downlink data of the second data transmission path.

During specific implementation, the end marker may be a packet, and may be referred to as an end marker packet. The end marker packet is a last packet on a data transmission path.

Step 403: The path aggregation network element sends, based on the indication information, the downlink data of the second data transmission path after sending of the downlink data of the first data transmission path is completed.

Based on the embodiment shown in FIG. 4, a control plane network element such as the SMF may indicate the path aggregation network element to send, after sending of the downlink data of the first data transmission path is completed, the downlink data of the second data transmission path, so that a problem of disorder of a downlink data packet in the PSA change procedure or the user plane connection activation procedure is resolved, thereby improving user experience.

Figure 5:
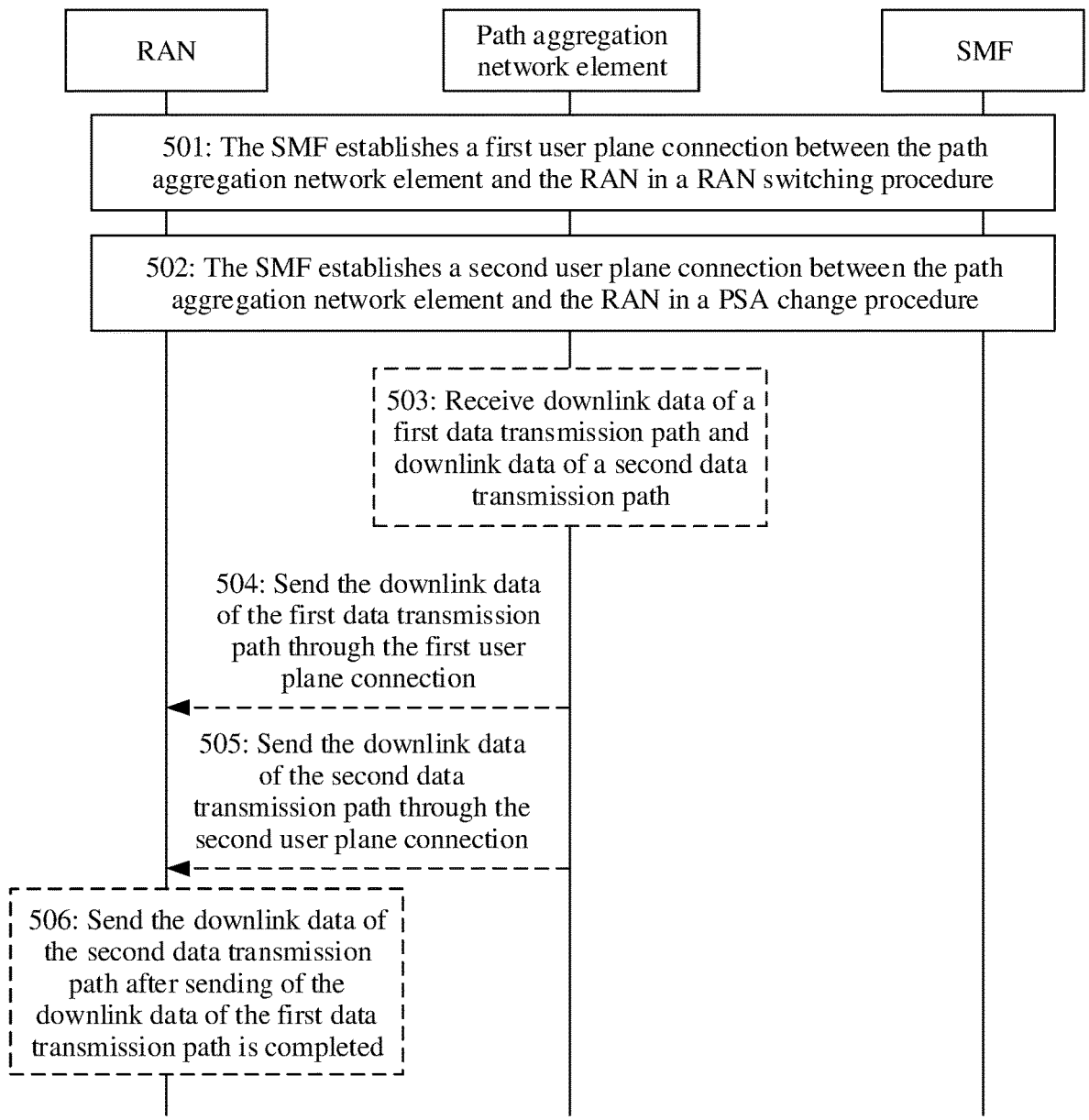
FIG. 5 is a flowchart of another method for controlling disorder of downlink data according to this application.

FIG. 5 shows another method for controlling disorder of downlink data according to this application. In the method, an idea for resolving the foregoing problem of disorder of downlink data is as follows: An SMF indicates to establish two user plane connections. Old data (namely, downlink data of a first data transmission path) is sent to a RAN 2 through a first user plane connection, and new data (namely, downlink data of a second data transmission path) is sent to the RAN 2 through a second user plane connection, so that the RAN 2 can distinguish between the downlink data of the first data transmission path and the downlink data of the second data transmission path. Further, the RAN 2 may complete sending of the downlink data of the first data transmission path, and then send the downlink data of the second data transmission path, to resolve the problem of disorder.

A path aggregation network element is a network node that aggregates the first data transmission path and the second data transmission path.

This embodiment may be applied to the foregoing application scenario 2 and the foregoing application scenario 3 in the PSA change procedure, that is, may resolve the problem of disorder of downlink data in the application scenarios shown in FIG. 2(b) and FIG. 2(c). For FIG. 2(b), the path aggregation network element is an I-UPF 2. For FIG. 2(c), the path aggregation network element is a PSA 2/an I-UPF 2.

The method includes the following steps.

Step 501: The SMF establishes a first user plane connection between the path aggregation network element and a RAN in a RAN switching procedure.

After the RAN switching procedure is completed, a RAN accessed by UE may be switched from a RAN 1 to the RAN 2. The RAN in an embodiment 5 is the RAN 2 after RAN switching.

When the UE moves, the RAN switching procedure is triggered. In a process of the RAN switching procedure, the first data transmission path is established, and a user plane connection between the RAN and the path aggregation network element is established and is referred to as a first user plane connection. For FIG. 2(b), the first user plane connection is a user plane connection between the RAN and the I-UPF 2. For FIG. 2(c), the first user plane connection is a user plane connection between the RAN and the PSA 2/I-UPF 2.

The first user plane connection is used by the path aggregation network element to send, to the RAN 2, the downlink data received from the first data transmission path. The first data transmission path is a path before PSA changing in a PSA change procedure after the RAN switching procedure.

Step 502: The SMF establishes a second user plane connection between the path aggregation network element and the RAN in the PSA change procedure.

After the RAN switching procedure is completed, when entering the PSA change procedure, the SMF further establishes the second user plane connection between the path aggregation network element and the RAN. The second user plane connection is used by the path aggregation network element to send, to the RAN, the downlink data received from the second data transmission path. The second data transmission path is a path obtained after PSA changing. The second user plane connection may also be referred to as a forwarding tunnel between the path aggregation network element and the RAN.

In an embodiment, the SMF establishes the second user plane connection between the path aggregation network element and the RAN by using the following method. The SMF sends first indication information to the RAN. The first indication information indicates the RAN to allocate tunnel information of the second user plane connection. The RAN allocates the tunnel information of the second user plane connection, and sends the tunnel information of the second user plane connection to the SMF. After receiving the tunnel information, of the second user plane connection, sent by the RAN, the SMF sends the tunnel information of the second user plane connection to the path aggregation network element. In this way, the path aggregation network element may obtain the tunnel information, of the second user plane connection, sent by the RAN.

Further, the SMF may further send second indication information to the path aggregation network element. The second indication information indicates the path aggregation network element to send, through the second user plane connection, the downlink data of the second data transmission path to the RAN. In this way, the path aggregation network element may subsequently send the downlink data of the second data transmission path to the RAN through the second user plane connection.

After step 502, the method may further include the following steps.

Step 503: The path aggregation network element receives the downlink data of the first data transmission path and the downlink data of the second data transmission path.

For FIG. 2(b), the path aggregation network element, namely, the I-UPF 2, receives the downlink data of the first data transmission path from a PSA 1, and receives the downlink data of the second data transmission path from a PSA 2.

For FIG. 2(c), the path aggregation network element, namely, the PSA 2/I-UPF 2, receives the downlink data of the first data transmission path from a PSA 1, and receives the downlink data of the second data transmission path from a DN.

Step 504: The path aggregation network element sends the downlink data of the first data transmission path to the RAN through the first user plane connection between the path aggregation network element and the RAN.

Step 505: The path aggregation network element sends the downlink data of the second data transmission path to the RAN through the second user plane connection between the path aggregation network element and the RAN.

It should be noted that there is no strict sequence between step 504 and step 505, and the two steps may alternatively be performed at the same time. This is not limited in the present disclosure.

After step 505, the method may further include the following steps.

Step 506: The RAN sends the downlink data of the second data transmission path after sending of the downlink data of the first data transmission path is completed.

For example, after receiving an end marker from the first data transmission path, if the RAN determines that sending of the downlink data of the first data transmission path is completed, the RAN then sends the buffered downlink data of the second data transmission path to the UE.

According to the foregoing embodiment, the SMF establishes the two user plane connections between the path aggregation network element and the RAN, so that the downlink data of the first data transmission path and the downlink data of the second data transmission path can be separately sent through different user plane connections. In this way, the RAN can distinguish between the downlink data of the first data transmission path and the downlink data of the second data transmission path. Further, the RAN may complete sending of the downlink data of the first data transmission path, and then send the downlink data of the second data transmission path, to resolve the problem of disorder.

Figure 6:
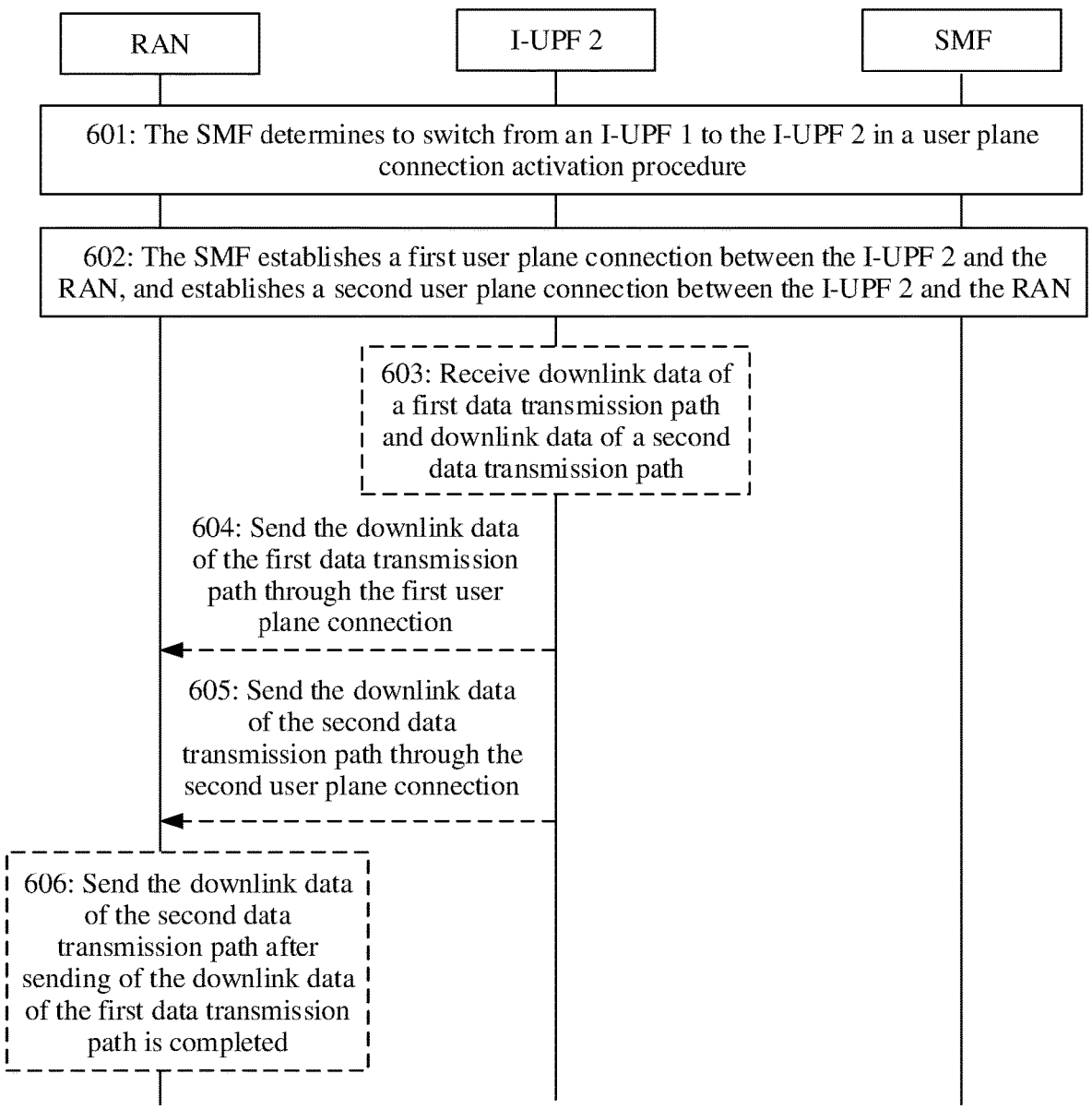
FIG. 6 is a flowchart of another method for controlling disorder of downlink data according to this application.

FIG. 6 shows another method for controlling disorder of downlink data according to this application. In the method, an idea for resolving the foregoing problem of disorder of downlink data is as follows: An SMF indicates to establish two user plane connections. Old data (namely, downlink data of a first data transmission path) is sent to a RAN through a first user plane connection, and new data (namely, downlink data of a second data transmission path) is sent to the RAN through a second user plane connection, so that the RAN can distinguish between the downlink data of the first data transmission path and the downlink data of the second data transmission path. Further, the RAN may complete sending of the downlink data of the first data transmission path, and then send the downlink data of the second data transmission path, to resolve the problem of disorder.

This embodiment may be applied to an application scenario in a user plane connection activation procedure, that is, may resolve the problem of disorder of downlink data in the application scenario shown in FIG. 3.

The method includes the following steps.

Step 601: The SMF determines to switch from an I-UPF 1 to an I-UPF 2 in the user plane connection activation procedure.

For example, the SMF determines, based on a location of UE, that the UE moves, so that the SMF reselects the I-UPF 2 for the UE, that is, switches from the I-UPF 1 to the I-UPF 2.

Step 602: The SMF establishes a first user plane connection between the I-UPF 2 and a RAN, and establishes a second user plane connection between the I-UPF 2 and the RAN.

The RAN herein is a RAN to which the UE re-accesses after moving, namely, the RAN 2 in FIG. 3.

The I-UPF 2 herein may also be referred to as a path aggregation network element.

The first user plane connection is used by the I-UPF 2 to send, to the RAN, the downlink data received from the first data transmission path, and the second user plane connection is used by the I-UPF 2 to send, to the RAN, the downlink data received from the second data transmission path. The first data transmission path is a path before UPF switching, and the second data transmission path is a path after UPF switching.

In an embodiment, the SMF establishes the second user plane connection between the I-UPF 2 and the RAN by using the following method. The SMF sends first indication information to the RAN. The first indication information indicates the RAN to allocate tunnel information of the second user plane connection. The RAN allocates the tunnel information of the second user plane connection, and sends the tunnel information of the second user plane connection to the SMF. After receiving the tunnel information, of the second user plane connection, sent by the RAN, the SMF sends the tunnel information of the second user plane connection to the I-UPF 2. In this way, the I-UPF 2 may obtain the tunnel information, of the second user plane connection, sent by the RAN.

Further, the SMF may further send second indication information to the I-UPF 2. The second indication information indicates the I-UPF 2 to send, through the second user plane connection, the downlink data of the second data transmission path to the RAN. In this way, the I-UPF 2 may subsequently send the downlink data of the second data transmission path to the RAN through the second user plane connection.

After step 602, the method may further include the following steps.

Step 603: The I-UPF 2 receives the downlink data of the first data transmission path and the downlink data of the second data transmission path.

The I-UPF 2 receives the downlink data of the first data transmission path from the I-UPF 1, and receives the downlink data of the second data transmission path from a PSA.

Step 604: The I-UPF 2 sends the downlink data of the first data transmission path to the RAN through the first user plane connection between the I-UPF 2 and the RAN.

Step 605: The I-UPF 2 sends the downlink data of the second data transmission path to the RAN through the second user plane connection between the I-UPF 2 and the RAN.

After step 605, the method may further include the following steps.

Step 606: The RAN sends the downlink data of the second data transmission path after sending of the downlink data of the first data transmission path is completed.

For example, after receiving an end marker from the first data transmission path, if the RAN determines that sending of the downlink data of the first data transmission path is completed, the RAN then sends the buffered downlink data of the second data transmission path to the UE.

According to the foregoing embodiment, the SMF establishes the two user plane connections between the I-UPF 2 and the RAN, so that the downlink data of the first data transmission path and the downlink data of the second data transmission path can be separately sent through different user plane connections. In this way, the RAN can distinguish between the downlink data of the first data transmission path and the downlink data of the second data transmission path. Further, the RAN may complete sending of the downlink data of the first data transmission path, and then send the downlink data of the second data transmission path, to resolve the problem of disorder.

For the foregoing embodiments for resolving the problem of disorder of downlink data, specific embodiments are provided for description.

It should be noted that, in the following embodiments, an example in which a UPF allocates tunnel information is used for description. Actually, the tunnel information may alternatively be allocated by an SMF.

Figure 7A:
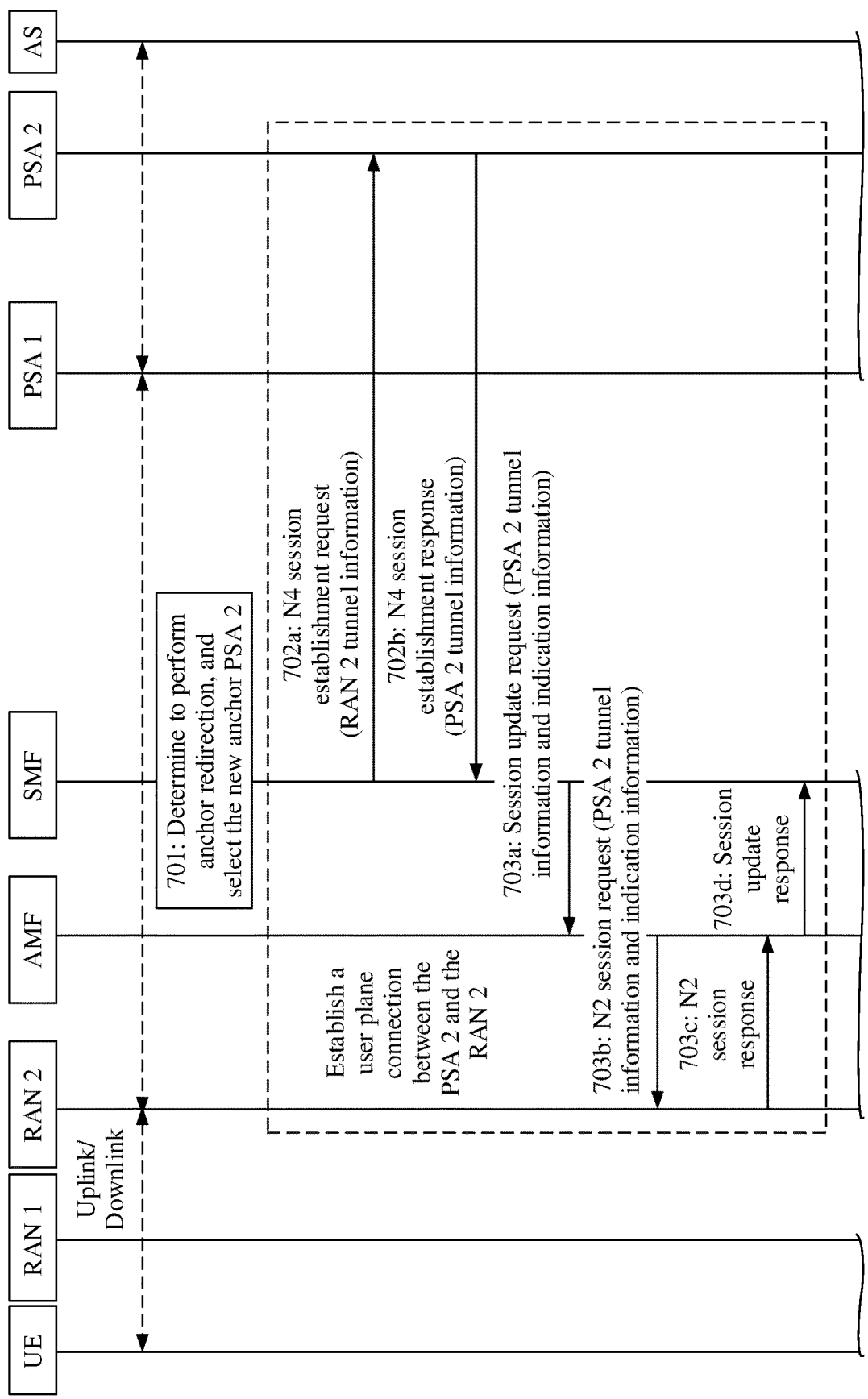
FIG. 7A and FIG. 7B is a flowchart of another method for controlling disorder of downlink data according to this application.
Figure 7B:
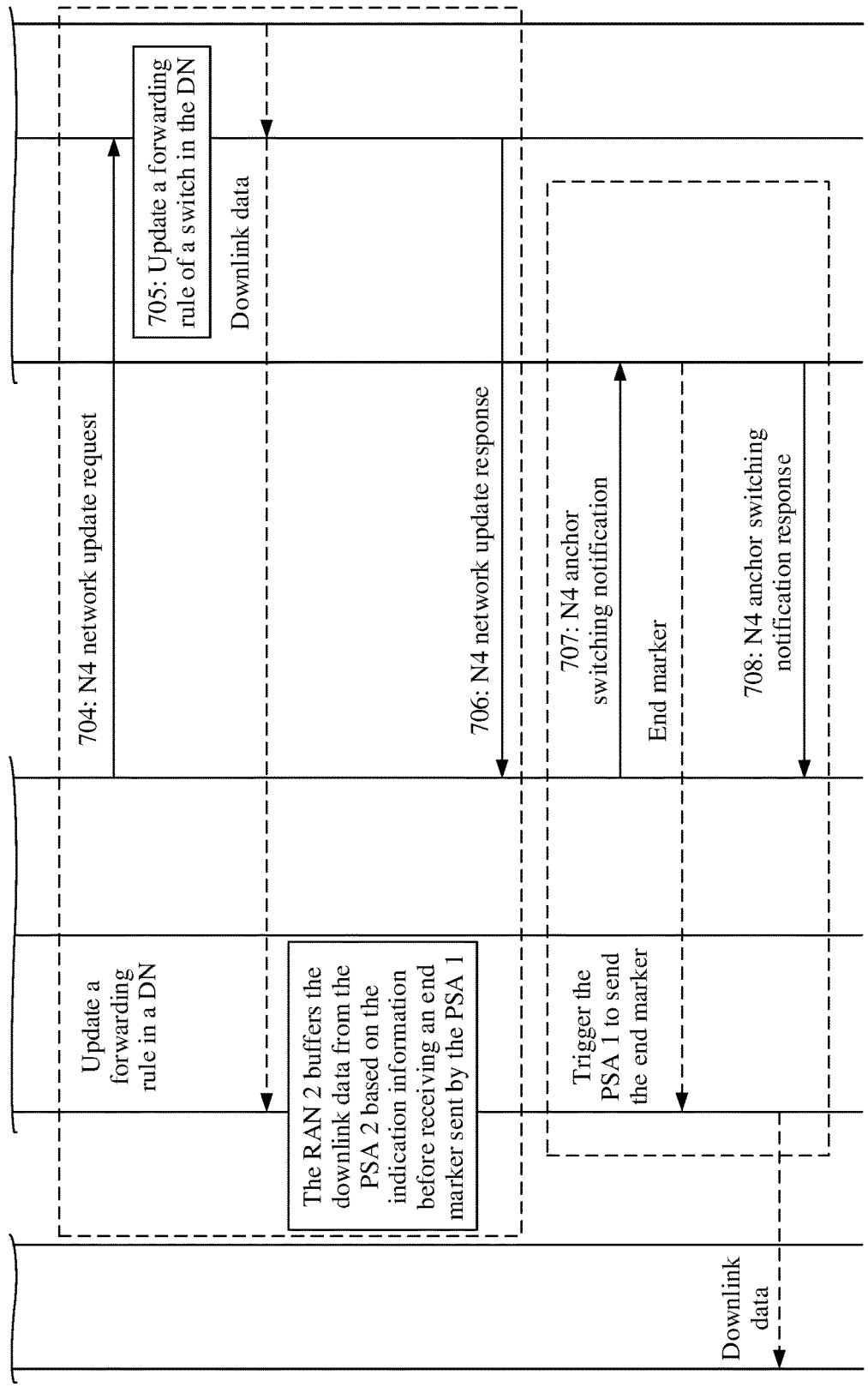

FIG. 7A and FIG. 7B show a method for controlling disorder of downlink data according to this application. The method is used to resolve the problem of disorder of downlink data in the PSA change procedure shown in FIG. 2(a), and the method is specific implementation of the method in the embodiment shown in FIG. 4.

Before steps shown in FIG. 7A and FIG. 7B are performed, a transmission path of uplink/downlink data passes through UE, a RAN 2, a PSA 1, and an AS.

The method includes the following steps.

Step 701: An SMF determines to perform anchor redirection and selects a new anchor PSA 2.

The SMF determines that a packet sequencing function is located in the RAN 2. Therefore, the SMF needs to indicate the RAN 2 to buffer, before an end marker is received from the PSA 1, downlink data from the PSA 2.

That the SMF determines that a packet sequencing function is located in the RAN 2 may also be described as follows: The SMF determines that the RAN 2 is a convergence point of a path before anchor redirection and a path after anchor redirection. In other words, in any one of the following scenarios, the SMF determines that the packet sequencing function is located in the RAN 2.

(1) The RAN 2 is directly connected to a source PSA (namely, the PSA 1), and the RAN 2 is directly connected to a target PSA (namely, the PSA 2).

(2) The RAN 2 is directly connected to a source PSA (namely, the PSA 1), and the RAN 2 is connected to a target PSA (namely, the PSA 2) through an I-UPF.

(3) The RAN 2 is connected to a source PSA (namely, the PSA 1) through an I-UPF, and the RAN 2 is directly connected to a target PSA (namely, the PSA 2).

(4) The RAN 2 is connected to a source PSA (namely, the PSA 1) through an I-UPF, and the RAN 2 is connected to a target PSA (namely, the PSA 2) through another I-UPF.

The following step 702*a* and step 702*b*, and step 703*a* and step 703*d* are used to establish a user plane connection between the PSA 2 and the RAN 2.

Step 702*a* and step 702*b*: The SMF sends an N4 session establishment request to the PSA 2. The N4 session establishment request carries RAN 2 tunnel information. The PSA 2 returns an N4 session establishment response to the SMF. The N4 session establishment response carries PSA 2 tunnel information.

The tunnel information may include at least one of a tunnel endpoint identifier (TED), an IP address, or the like.

The SMF may obtain the RAN 2 tunnel information in a step of establishing a user plane connection between the RAN 2 and the PSA 1 in a RAN switching procedure.

Step 703*a*: The SMF sends a session update request to an AMF. The session update request carries the PSA 2 tunnel information and indication information.

The indication information indicates the RAN 2 to buffer, before the end marker is received from the PSA 1, the downlink data from the PSA 2. The indication information may be understood as a forwarding rule.

During specific implementation, the session update request may be, for example, Nsmf_PDUSessionUpdateSMContext Request.

Step 703*b*: The AMF sends an N2 session request to the RAN 2. The N2 session request carries the PSA 2 tunnel information and the indication information.

Step 703*c*: The RAN 2 returns an N2 session response to the AMF.

Step 703*d*: The AMF returns a session update response to the SMF.

During specific implementation, the session update response may be, for example, Nsmf_PDUSessionUpdateSMContext Response.

The foregoing step 703*c* and step 703*d* are optional steps.

A forwarding rule in a DN may be updated by using the following step 704 to step 706. To be specific, the downlink data is not sent to the UE through the PSA 1. Instead, the PSA 1 is updated to the PSA 2.

Step 704: The SMF sends an N4 network update request (N4 DN Update request) to the PSA 2.

Step 705: The PSA 2 sends an uplink packet or an address resolution protocol (ARP) packet to the data network DN based on the received N4 network update request, to update a forwarding rule of a switch in the DN.

The ARP packet herein may be a normal ARP packet or a gratuitous ARP packet. A destination address of the normal ARP packet is an IP address of a peer node, and a destination address of the gratuitous ARP packet is a UE IP.

During specific implementation, the DN herein may be an application server AS in the ethernet DN.

After updating of the forwarding rule is completed, the AS sends the downlink data to the PSA 2, and then the PSA 2 sends the downlink data to the RAN 2. In addition, the RAN 2 buffers the downlink data from the PSA 2 based on the indication information before receiving the end marker sent by the PSA 1.

Step 706: The PSA 2 returns an N4 network update response (N4 DN Update response) to the SMF.

This step is an optional step.

In the following step 707 and step 708, the PSA 1 is triggered to send the end marker.

Step 707: The SMF sends an N4 anchor switching notification (N4 anchor change notification) to the PSA 1.

After receiving the N4 anchor switching notification, the PSA 1 learns that the anchor has been switched, that is, switched from the PSA 1 to the PSA 2. Therefore, the PSA 1 sends the end marker on an old path, namely, a path on which the nodes PSA 1 and RAN 2 are located. After receiving the end marker, the RAN 2 learns that the end marker packet is a last packet on the old path, so that the RAN 2 can send the buffered downlink data from the PSA 2 to the UE.

In an example, the PSA 1 may be triggered, in the following two manners, to send the end marker.

Manner 1: In step 704, the SMF starts a timer. When the timer expires, the SMF notifies the PSA 1 to send the end marker. Alternatively, in step 705, the PSA 2 starts a timer. When the timer expires, the PSA 2 notifies, through the SMF, the PSA 1 to send the end marker.

Manner 2: When the PSA 1 receives the uplink packet or the ARP packet broadcast by the PSA 2 in step 705, the PSA 1 triggers sending of the end marker.

It should be noted that, this application does not necessarily depend on sending of the end marker, and a buffered downlink packet may also be sent by using a timer mechanism. The timer indicates time when the forwarding rule in the ethernet is updated. If the timer expires, it indicates that updating of the forwarding rule in the ethernet is completed.

A manner of setting of a value of the timer is not limited in this application either. For example, the value of the timer may be set based on policy configuration. A specific description is as follows: If the SMF or the PSA 2 starts the timer (if the SMF starts the timer, the timer is started in step 704; or if the PSA 2 starts the timer, the timer is started in step 705), when the timer expires, the SMF or the PSA 2 notifies the RAN 2 to start to send the buffered downlink data to the UE. In this case, the indication information in step 703*a* and step 703*b* indicates the RAN 2 to buffer, before the RAN 2 receives an indication from the SMF, the downlink data from the PSA 2. The indication is triggered when the timer expires.

It should be noted that, in the present disclosure, the end marker may alternatively be sent by the AS. A manner of triggering the AS to send the end marker is similar to a manner of triggering the PSA 1 to send the end marker. The following two manners may be included.

Manner 1: A timer mechanism is set. The timer may be started by the SMF, the PSA 2, or the AS. If the timer is started by the SMF or the PSA 2, when the timer expires, the SMF indicates the AS to send the end marker to the old path; or if the timer is started by the AS, when the timer expires, the AS sends the end marker to the old path. Manner 2: When the AS receives the uplink packet or the ARP packet broadcast by the PSA 2 in step 705, the AS triggers sending of the end marker.

Step 708: The PSA 1 returns an N4 anchor switching notification response (N4 anchor change notification Response).

This step is optional.

According to the embodiment shown in FIG. 7A and FIG. 7B, the problem of disorder of downlink data in the scenario shown in FIG. 2(*a*) is resolved, thereby improving user experience.

Figure 8A:
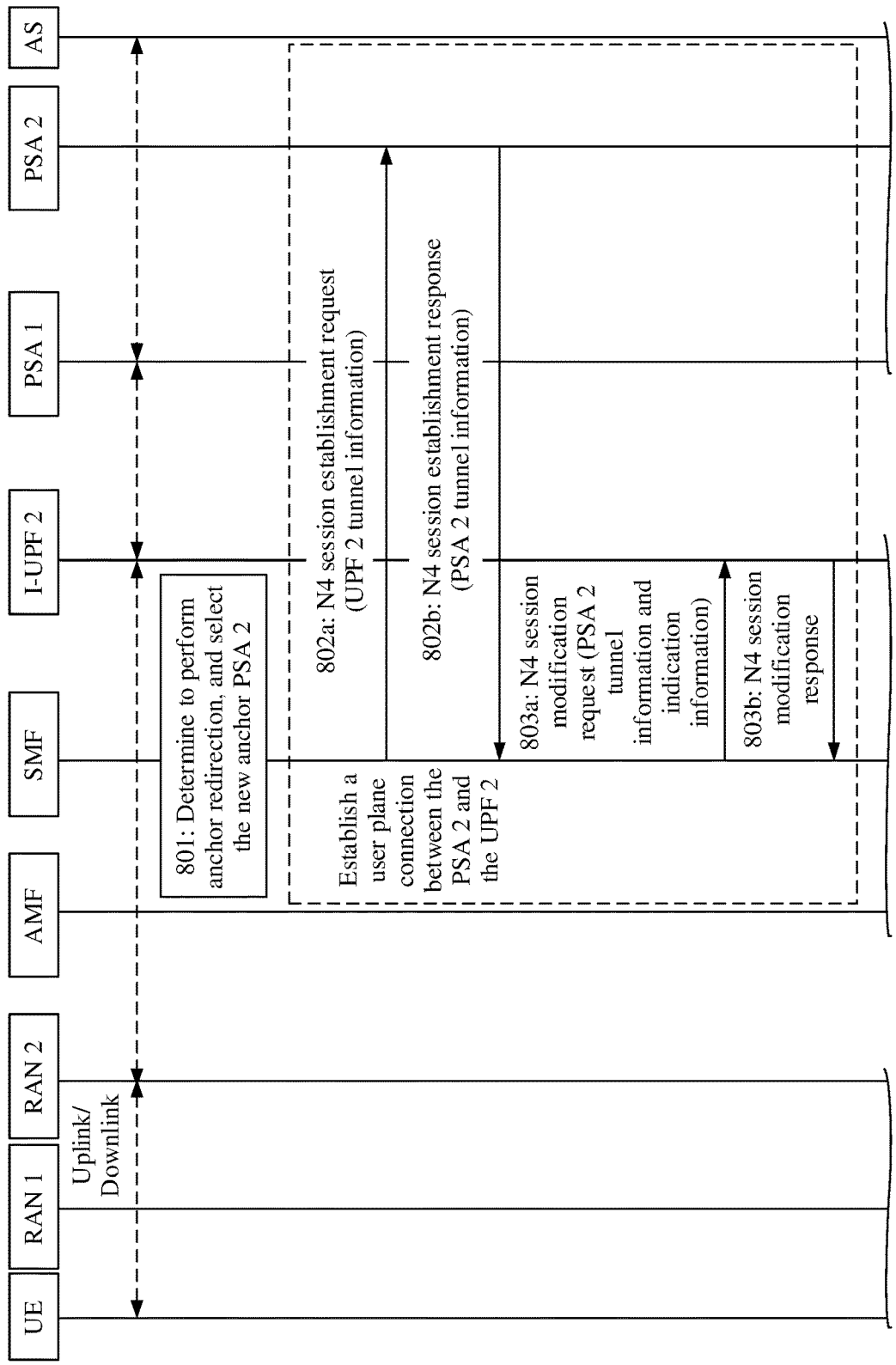
FIG. 8A and FIG. 8B is a flowchart of another method for controlling disorder of downlink data according to this application.
Figure 8B:
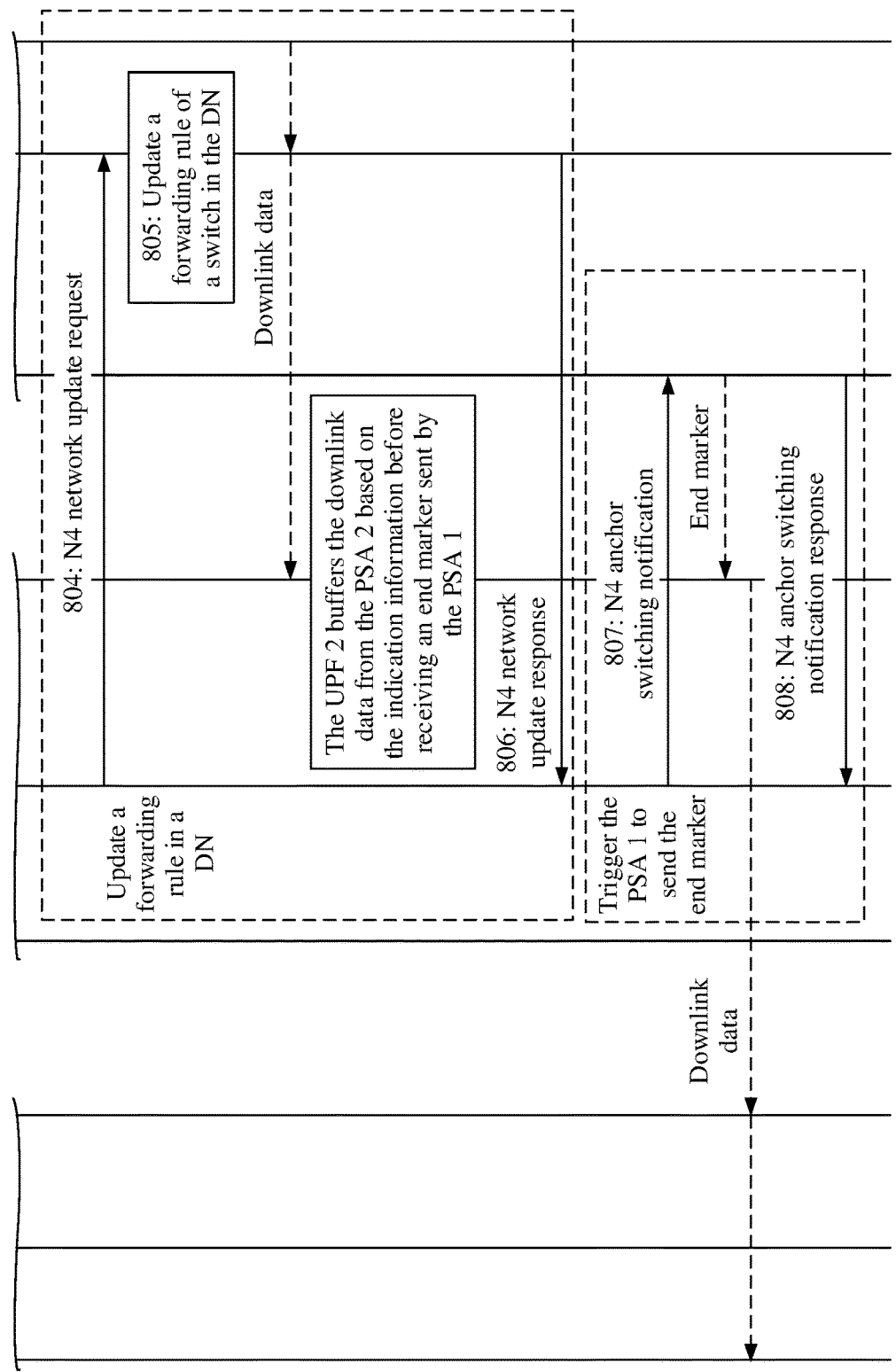

FIG. 8A and FIG. 8B show a method for controlling disorder of downlink data according to this application. The method is used to resolve the problem of disorder of downlink data in the PSA change procedure shown in FIG. 2(*b*), and the method is specific implementation of the method in the embodiment shown in FIG. 4.

Before steps shown in FIG. 8A and FIG. 8B are performed, a transmission path of uplink/downlink data passes through UE, a RAN 2, an I-UPF 2, a PSA 1, and an AS.

The method includes the following steps.

Step 801 is the same as step 701 in the embodiment shown in FIG. 7A and FIG. 7B.

In step 801, the SMF determines that a packet sequencing function is located in the I-UPF 2. Therefore, the SMF needs to indicate the I-UPF 2 to buffer, before an end marker is received from the PSA 1, downlink data from a PSA 2.

That the SMF determines that a packet sequencing function is located in the I-UPF 2 may also be described as follows: The SMF determines that the I-UPF 2 is a convergence point of a path before anchor redirection and a path after anchor redirection. Specifically, in any one of the following scenarios, the SMF determines that the packet sequencing function is located in the I-UPF 2.

The RAN 2 is connected to a source PSA (namely, the PSA 1) through the I-UPF 2, and the RAN 2 is directly connected to a target PSA (namely, the PSA 2) through the I-UPF 2.

The following step 802*a* and step 802*b*, and step 803*a* and step 803*b* are used to establish a user plane connection between the PSA 2 and the I-UPF 2.

Step 802*a* and step 802*b*: The SMF sends an N4 session establishment request to the PSA 2. The N4 session establishment request carries I-UPF 2 tunnel information. The PSA 2 returns an N4 session establishment response to the SMF. The N4 session establishment response carries PSA 2 tunnel information.

The I-UPF 2 tunnel information may be obtained by the SMF in a step of inserting the I-UPF 2 in a RAN switching procedure of the UE.

The tunnel information may include at least one of a TEID, an IP address, or the like.

Step 803*a*: The SMF sends an N4 session modification request to the I-UPF 2. The N4 session modification request carries the PSA 2 tunnel information and indication information.

The indication information indicates the I-UPF 2 to buffer, before the end marker is received from the PSA 1, the downlink data from the PSA 2. The indication information may be understood as a forwarding rule.

Step 803*b*: The I-UPF 2 sends an N4 session modification response to the SMF.

This step is optional.

Step 804 to step 806 are the same as step 704 to step 706 in the embodiment shown in FIG. 7A and FIG. 7B. Refer to the foregoing descriptions.

After updating of the forwarding rule is completed, the AS may send the downlink data to the PSA 2, and then the PSA 2 sends the downlink data to the I-UPF 2. In addition, the I-UPF 2 buffers the downlink data from the PSA 2 based on the indication information before receiving the end marker sent by the PSA 1.

In the following step 807 and step 808, the PSA 1 is triggered to send the end marker.

Step 807: The SMF sends an N4 anchor switching notification (N4 anchor change notification) to the PSA 1.

After receiving the N4 anchor switching notification, the PSA 1 learns that the anchor has been switched, that is, switched from the PSA 1 to the PSA 2. Therefore, the PSA 1 sends the end marker on an old path, namely, a path on which the nodes PSA 1 and I-UPF 2 are located. After receiving the end marker, the I-UPF 2 learns that the end marker packet is a last packet on the old path, so that the I-UPF 2 can send the buffered downlink data from the PSA 2 to the RAN 2.

In an example, the PSA 1 may be triggered, in the following two manners, to send the end marker.

Manner 1: In step 804, the SMF starts a timer. When the timer expires, the SMF notifies the PSA 1 to send the end marker. Alternatively, in step 805, the PSA 2 starts a timer. When the timer expires, the PSA 2 notifies, through the SMF, the PSA 1 to send the end marker.

Manner 2: When the PSA 1 receives an uplink packet, an ARP packet, or a gratuitous ARP packet broadcast by the PSA 2 in step 805, the PSA 1 triggers sending of the end marker.

It should be noted that, this application does not necessarily depend on sending of the end marker, and a buffered downlink packet may also be sent by using a timer mechanism. The timer indicates time when the forwarding rule in the ethernet is updated. If the timer expires, it indicates that updating of the forwarding rule in the ethernet is completed.

A manner of setting of a value of the timer is not limited in this application either. For example, the value of the timer may be set based on policy configuration. A specific description is as follows: If the SMF or the PSA 2 starts the timer (if the SMF starts the timer, the timer is started in step 804; or if the PSA 2 starts the timer, the timer is started in step 805), when the timer expires, the SMF or the PSA 2 notifies the I-UPF 2 to start to send the buffered downlink data to the RAN 2. In this case, the indication information in step 803*a* and step 803*b* indicates the I-UPF 2 to buffer, before the I-UPF 2 receives an indication from the SMF, the downlink data from the PSA 2. The indication is triggered when the timer expires.

It should be noted that, in the present disclosure, the end marker may alternatively be sent by the AS. This step is the same as step 708 in the embodiment shown in FIG. 7A and FIG. 7B in which the AS sends the end marker. For details, refer to the foregoing descriptions.

Step 808: The PSA 1 returns an N4 anchor switching notification response (N4 anchor change notification Response).

This step is optional.

According to the embodiment shown in FIG. 8A and FIG. 8B, the problem of disorder of downlink data in the scenario shown in FIG. 2(*b*) is resolved, thereby improving user experience.

Figure 9A:
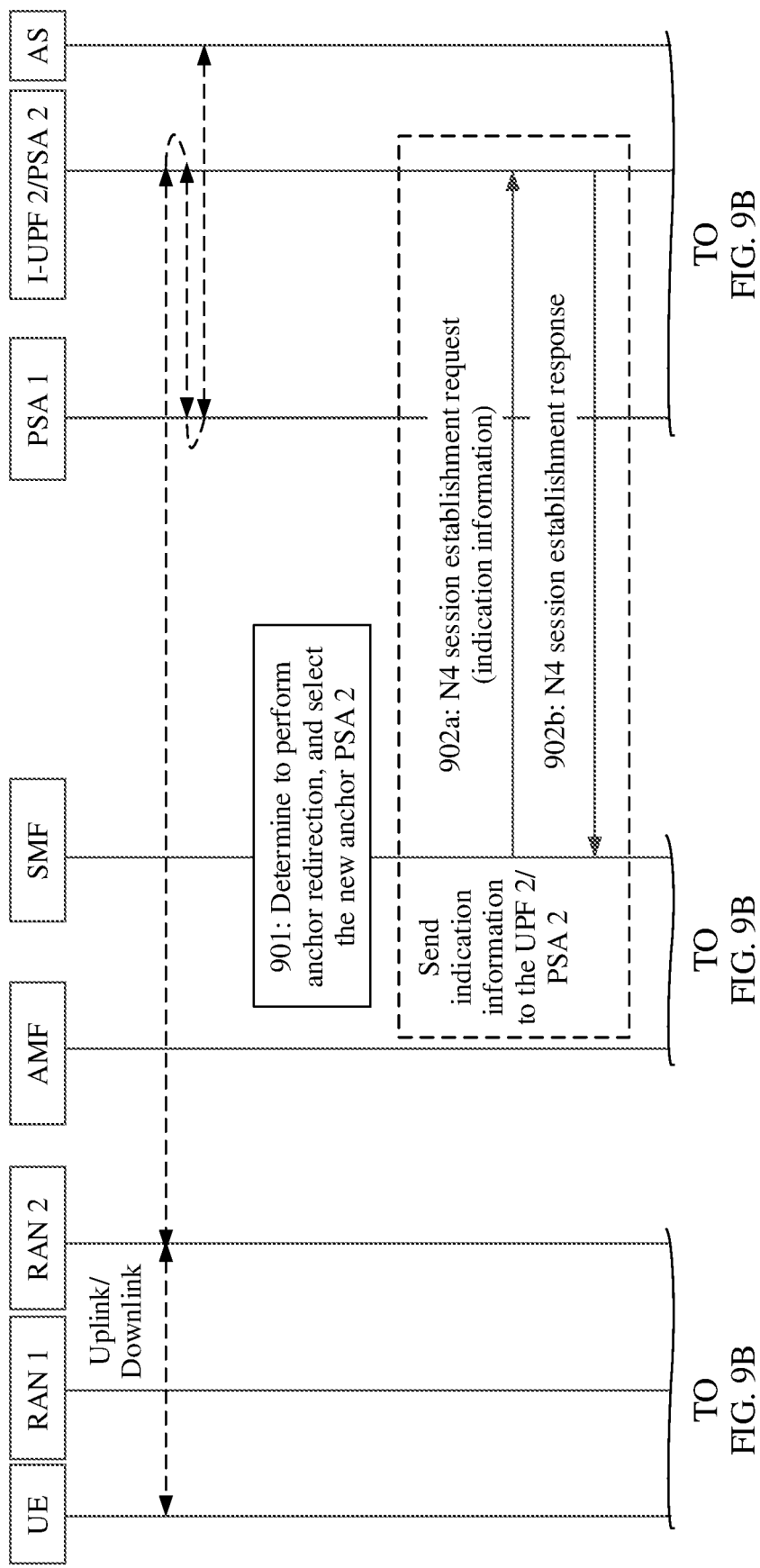

FIG. 9A and FIG. 9B show a method for controlling disorder of downlink data according to this application. The method is used to resolve the problem of disorder of downlink data in the PSA change procedure shown in FIG. 2(*c*), and the method is specific implementation of the method in the embodiment shown in FIG. 4.

Before steps shown in FIG. 9A and FIG. 9B are performed, a transmission path of uplink/downlink data passes through UE, a RAN 2, an I-UPF 2/a PSA 2, a PSA 1, and an AS.

The method includes the following steps.

Step 901 is the same as step 701 in the embodiment shown in FIG. 7A and FIG. 7B.

In step 901, the SMF determines that a packet sequencing function is located in the PSA 2/I-UPF 2. Therefore, the SMF needs to indicate the PSA 2/I-UPF 2 to buffer, before an end marker is received from the PSA 1, downlink data from the PSA 2.

That the SMF determines that a packet sequencing function is located in the PSA 2/I-UPF 2 may also be described as follows: The SMF determines that the PSA 2/I-UPF 2 is a convergence point of a path before anchor redirection and a path after anchor redirection. Specifically, in the following scenario, the SMF determines that the packet sequencing function is located in the PSA 2/I-UPF 2. The RAN 2 is connected to a source PSA (namely, the PSA 1) through the PSA 2/I-UPF 2, and the RAN 2 is directly connected to the PSA 2/I-UPF 2.

That the SMF indicates the PSA 2/I-UPF 2 to buffer the downlink data from the PSA 2 may also be described as indicating the PSA 2/I-UPF 2 to buffer downlink data from the AS.

The following step 902*a* and step 902*b* are used to indicate the I-UPF 2/PSA 2 to buffer, before the end marker is received from the PSA 1, downlink data from a DN.

Step 902*a* and step 902*b*: The SMF sends an N4 session establishment request to the PSA 2. The N4 session establishment request carries indication information. The PSA 2 returns an N4 session establishment response to the SMF.

The indication information indicates the I-UPF 2/PSA 2 to buffer, before the end marker is received from the PSA 1, the downlink data from the DN. The indication information may be understood as a forwarding rule.

Step 903 to step 905 are the same as step 704 to step 706 in the embodiment shown in FIG. 7A and FIG. 7B. Refer to the foregoing descriptions.

After updating of the forwarding rule is completed, the AS may send the downlink data to the I-UPF 2/PSA 2. The I-UPF 2/PSA 2 buffers the downlink data from the AS based on the indication information before receiving the end marker sent by the PSA 1.

In the following step 906 and step 907, the PSA 1 is triggered to send the end marker.

Step 907: The SMF sends an N4 anchor switching notification (N4 anchor change notification) to the PSA 1.

After receiving the N4 anchor switching notification, the PSA 1 learns that the anchor has been switched, that is, switched from the PSA 1 to the PSA 2. Therefore, the PSA 1 sends the end marker on an old path. After receiving the end marker, the I-UPF 2/PSA 2 learns that the end marker is a last packet on the old path, so that the I-UPF 2/PSA 2 can send the buffered downlink data from the AS to the RAN 2.

In an example, the PSA 1 may be triggered, in the following two manners, to send the end marker.

Manner 1: In step 903, the SMF starts a timer. When the timer expires, the SMF notifies the PSA 1 to send the end marker. Alternatively, in step 904, the I-UPF 2/PSA 2 starts a timer. When the timer expires, the I-UPF 2/PSA 2 notifies, through the SMF, the PSA 1 to send the end marker.

Manner 2: When the PSA 1 receives an uplink packet, an ARP packet, or a gratuitous ARP packet broadcast by the I-UPF 2/PSA 2 in step 904, the PSA 1 triggers sending of the end marker.

It should be noted that, this application does not necessarily depend on sending of the end marker, and a buffered downlink packet may also be sent by using a timer mechanism. The timer indicates time when the forwarding rule in the ethernet is updated. If the timer expires, it indicates that updating of the forwarding rule in the ethernet is completed.

A manner of setting of a value of the timer is not limited in this application either. For example, the value of the timer may be set based on policy configuration. A specific description is as follows: If the SMF or the I-UPF 2/PSA 2 starts the timer (if the SMF starts the timer, the timer is started in step 903; or if the I-UPF 2/PSA 2 starts the timer, the timer is started in step 904), when the timer expires, the SMF or the I-UPF 2/PSA 2 notifies the I-UPF 2/PSA 2 to start to send the buffered downlink data to the RAN 2. In this case, the indication information in step 902a indicates the I-UPF 2/PSA 2 to buffer, before the I-UPF 2/PSA 2 receives an indication from the SMF, the downlink data from the AS. The indication is triggered when the timer expires.

It should be noted that, in the present disclosure, the end marker may alternatively be sent by the application server. This step is the same as step 708 in the embodiment shown in FIG. 7A and FIG. 7B in which the application server sends the end marker. For details, refer to the foregoing descriptions.

Step 908: The PSA 1 returns an N4 anchor switching notification response (N4 anchor change notification Response).

This step is optional.

According to the embodiment shown in FIG. 9A and FIG. 9B, the problem of disorder of downlink data in the scenario shown in FIG. 2(c) is resolved, thereby improving user experience.

Figure 10A:
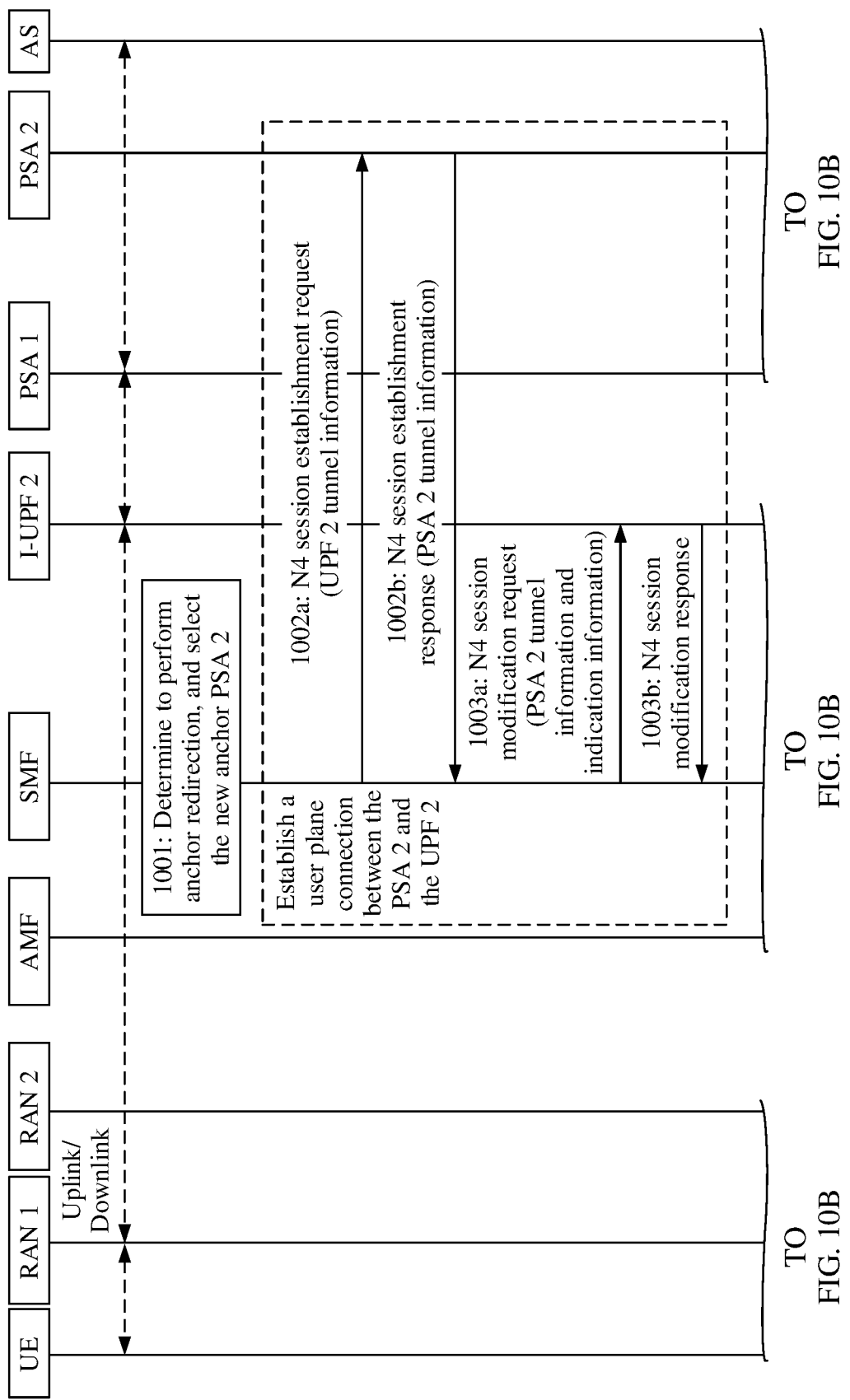
Figure 10B:
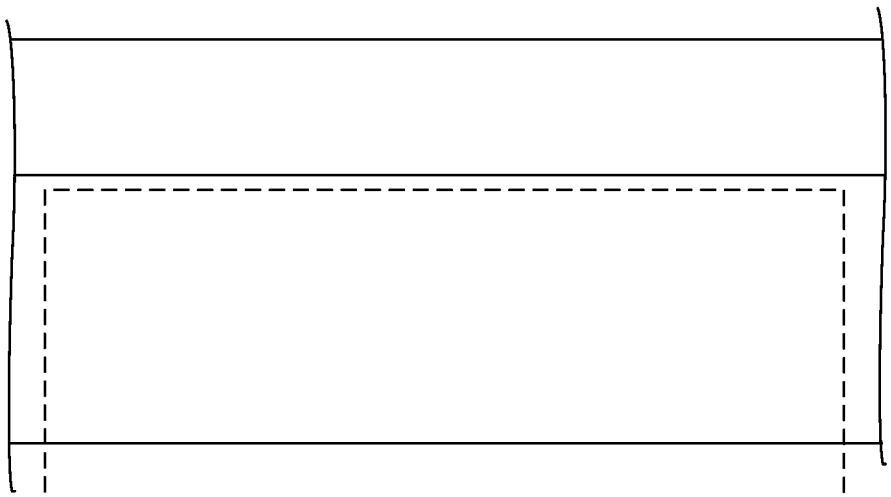
Figure 10B:
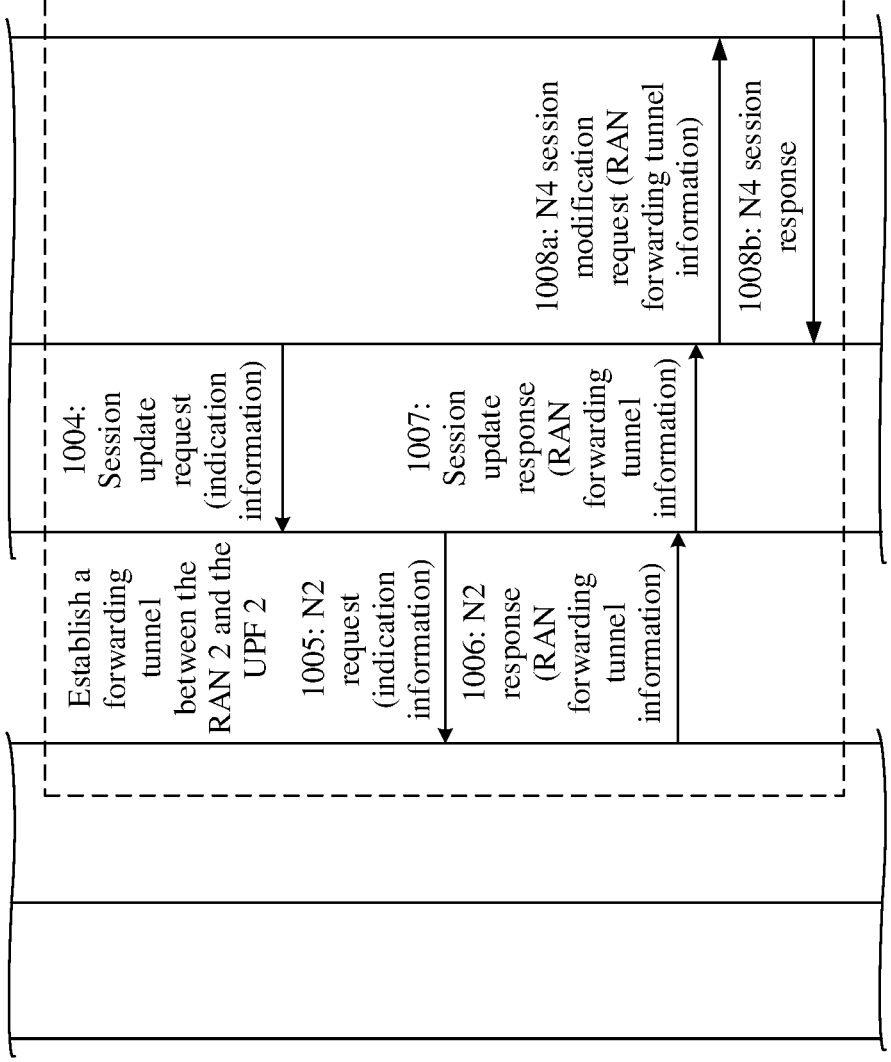

FIG. 10A, FIG. 10B, and FIG. 10C show a method for controlling disorder of downlink data according to this application. The method is used to resolve the problem of disorder of downlink data in the PSA change procedure shown in FIG. 2(b), and the method is specific implementation of the method in the embodiment shown in FIG. 5.

Before steps shown in FIG. 10A, FIG. 10B, and FIG. 10C are performed, a transmission path of uplink/downlink data passes through UE, a RAN 2, an I-UPF 2, a PSA 1, and an AS.

The method includes the following steps.

Step 1001: An SMF determines to perform anchor redirection and selects a new anchor PSA 2.

It should be noted that, before step 1001, an N3 user plane connection between the I-UPF 2 and the RAN 2 has been established in a RAN switching procedure. The N3 user plane connection may also be referred to as a first user plane connection, and the first user plane connection is used to transmit downlink data from the PSA 1.

The SMF determines to perform anchor redirection, selects the new anchor PSA 2, and determines to establish an N3 forwarding tunnel between the I-UPF 2 and the RAN 2. The N3 forwarding tunnel may also be referred to as a second user plane connection, and the N3 forwarding tunnel is used to transmit downlink data from the PSA 2.

The following step 1002a and step 1002b, and step 1003a and step 1003b are used to establish a user plane connection between the PSA 2 and the I-UPF 2.

Step 1002a and step 1002b are the same as step 802a and step 802b in the embodiment shown in FIG. 8A and FIG. 8B. Refer to the foregoing descriptions.

Step 1003a: The SMF sends an N4 session modification request to the I-UPF 2. The N4 session modification request carries PSA 2 tunnel information and indication information.

The indication information indicates the I-UPF 2 to send, through the second user plane connection (N3 forwarding tunnel), downlink data of a second data transmission path to the RAN 2.

In this application, the indication information may also be referred to as second indication information.

In an alternative implementation, the indication information in step 1003a may alternatively be carried by the SMF to the I-UPF 2 in step 1008a.

Step 1003b: The I-UPF 2 sends an N4 session modification response to the SMF. Optionally, the N4 session modification response message carries I-UPF 2 forwarding tunnel information.

This step is optional.

Step 1004: The SMF sends a session update request to an AMF. The session update request carries N2 session information, and the N2 session information includes indication information.

The indication information indicates the RAN 2 to allocate forwarding tunnel information.

In this application, the indication information may also be referred to as first indication information.

In an embodiment, the session update request may be, for example, Nsmf_PDUSession_UpdateContext Request.

Step 1005: The AMF sends an N2 request to the RAN 2. The N2 request carries the indication information in step 1004.

Step 1006: The RAN 2 allocates RAN forwarding tunnel information based on the indication information, and returns an N2 response to the AMF. The N2 response carries the allocated RAN forwarding tunnel information.

Step 1007: The AMF returns a session update response to the SMF. The session update response carries N2 session information, and the N2 session information includes the RAN forwarding tunnel information.

In an embodiment, the session update response may be, for example, Nsmf_PDUSession_UpdateContext Response.

Step 1008a and step 1008b: The SMF sends an N4 session modification request to the I-UPF 2. The N4 session modification request carries the RAN forwarding tunnel information. The I-UPF 2 returns an N4 session modification response to the SMF.

Step 1009 to step 1011 are the same as step 804 to step 806 in the embodiment shown in FIG. 8A and FIG. 8B. Refer to the foregoing descriptions.

Downlink data of the AS may be sent to the new anchor PSA 2. The PSA 2 sends the downlink data to the I-UPF 2 through the user plane connection between the PSA 2 and the I-UPF 2. The I-UPF 2 sends the downlink data to the RAN 2 through the N3 forwarding tunnel (namely, the second user plane connection) between the I-UPF 2 and the RAN 2. The RAN 2 buffers the downlink data before receiving an end marker from the N3 user plane connection (namely, the first user plane connection).

In the following step 1012 and step 1013, the PSA 1 is triggered to send the end marker.

Step 1012 is the same as step 807 in the embodiment shown in FIG. 8A and FIG. 8B. Refer to the foregoing descriptions.

The PSA 1 sends the end marker on an old path, that is, the PSA 1 sends the end marker to the I-UPF 2 through a user plane connection between the PSA 1 and the I-UPF 2. The I-UPF 2 sends the end marker to the RAN 2 through the N3 user plane connection (namely, the first user plane connection) between the I-UPF 2 and the RAN 2. It should be noted that an action of the I-UPF 2 is also applicable to the downlink data from the PSA 1. To be specific, the I-UPF 2 sends the downlink data from the PSA 1 to the RAN 2 through the N3 user plane connection between the I-UPF 2 and the RAN 2, and then the RAN 2 sends the downlink data from the N3 user plane connection to the UE through an air interface connection.

After receiving the end marker from the N3 user plane connection, the RAN 2 may send the buffered downlink data from the second user plane connection, namely, the downlink data from the PSA 2, to the RAN 2.

According to the embodiment shown in FIG. 10A, FIG. 10B, and FIG. 10C, the problem of disorder of downlink data in the scenario shown in FIG. 2(b) is resolved, thereby improving user experience.

Figure 11C:
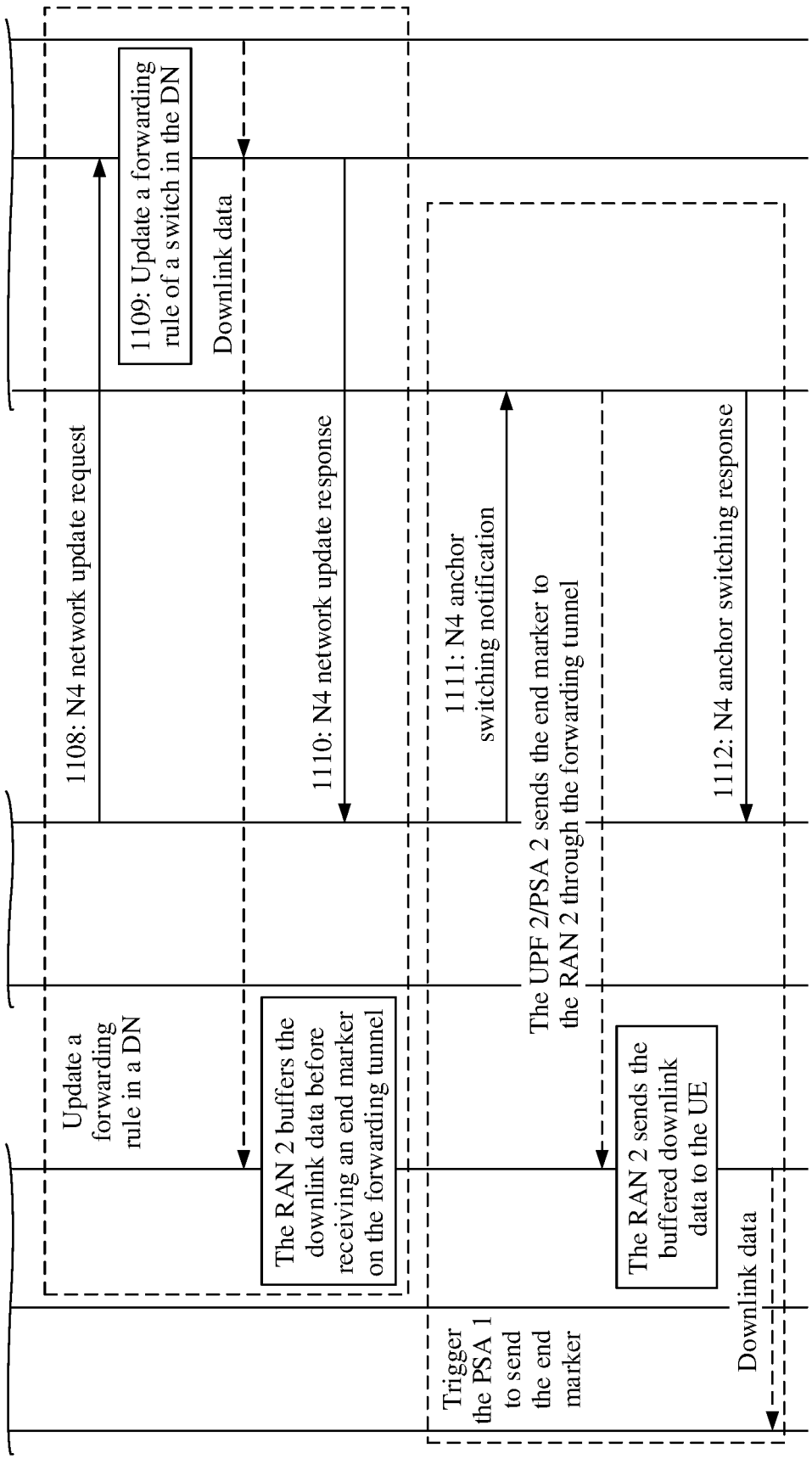

FIG. 11A, FIG. 11B, and FIG. 11C show a method for controlling disorder of downlink data according to this application. The method is used to resolve the problem of disorder of downlink data in the PSA change procedure shown in FIG. 2(c), and the method is specific implementation of the method in the embodiment shown in FIG. 5.

Before steps shown in FIG. 11A, FIG. 11B, and FIG. 11C are performed, a transmission path of uplink/downlink data passes through UE, a RAN 2, an I-UPF 2, a PSA 1, and an AS.

The method includes the following steps.

Step 1101: An SMF determines to perform anchor redirection and selects a new anchor PSA 2.

It should be noted that, before step 1001, in a RAN switching procedure, a UPF reselected by the SMF is the I-UPF 2, and an N3 user plane connection between the I-UPF 2 and the RAN 2 has been established. The N3 user plane connection may also be referred to as a first user plane connection, and the first user plane connection is used to transmit downlink data from the PSA 1.

The SMF determines to perform anchor redirection. In an anchor redirection procedure, the reselected new anchor PSA 2 is the I-UPF 2, that is, the I-UPF 2 and the PSA 2 are a same node.

After selecting the I-UPF 2/PSA 2, the SMF determines to establish an N3 forwarding tunnel between the I-UPF 2/PSA 2 and the RAN 2. The N3 forwarding tunnel may also be referred to as a second user plane connection, and the N3 forwarding tunnel is used to transmit downlink data from the PSA 2.

The following step 1102a and step 1102b are used to indicate the I-UPF 2/PSA 2 to send downlink data from the DN to the RAN 2 through the second user plane connection.

Step 1102a and step 1102b: The SMF sends an N4 session establishment request to the I-UPF 2/PSA 2. The N4 session establishment request carries indication information. The I-UPF 2/PSA 2 returns an N4 session establishment response to the SMF. Optionally, the N4 session establishment response carries I-UPF 2/PSA 2 forwarding tunnel information.

The indication information indicates the I-UPF 2/PSA 2 to send, through the second user plane connection (N3 forwarding tunnel), downlink data of a second data transmission path to the RAN 2.

In this application, the indication information may also be referred to as second indication information.

In an alternative implementation, the indication information in step 1102a may alternatively be carried by the SMF to the I-UPF 2/PSA 2 in step 1107b.

The following step 1103 to step 1107b are used to establish the forwarding tunnel between the RAN 2 and the I-UPF 2/PSA 2. The forwarding tunnel may also be referred to as the N3 forwarding tunnel or the first user plane connection.

Step 1103: The SMF sends a session update request to an AMF. The session update request carries N2 session information, and the N2 session information includes indication information.

The indication information indicates the RAN 2 to allocate forwarding tunnel information.

In this application, the indication information may also be referred to as first indication information.

In an embodiment, the session update request may be, for example, Nsmf_PDUSession_UpdateContext Request.

Step 1104: The AMF sends an N2 request to the RAN 2. The N2 request carries the indication information in step 1103.

Step 1105: The RAN 2 allocates RAN forwarding tunnel information based on the indication information, and returns an N2 response to the AMF. The N2 response carries the allocated RAN forwarding tunnel information.

Step 1106: The AMF returns a session update response to the SMF. The session update response carries N2 session information, and the N2 session information includes the RAN forwarding tunnel information.

In an embodiment, the session update response may be, for example, Nsmf_PDUSession_UpdateContext Response.

Step 1107a and step 1107b: The SMF sends an N4 session modification request to the I-UPF 2/PSA 2. The N4 session modification request carries the RAN forwarding tunnel information. The I-UPF 2/PSA 2 returns an N4 session modification response to the SMF.

Step 1009 to step 1011 are the same as step 903 to step 905 in the embodiment shown in FIG. 9A and FIG. 9B. Refer to the foregoing descriptions.

Downlink data of the AS may be sent to the new anchor I-UPF 2/PSA 2. The I-UPF 2/PSA 2 sends the downlink data to the RAN 2 through the N3 forwarding tunnel (which may be referred to as the second user plane connection) between the I-UPF 2/PSA 2 and the RAN 2. The RAN 2 buffers the downlink data before receiving an end marker from the N3 user plane connection (namely, the first user plane connection).

In the following step 1111 and step 1112, the PSA 1 is triggered to send the end marker.

Step 1111 is the same as step 906 in the embodiment shown in FIG. 9A and FIG. 9B. Refer to the foregoing descriptions.

The PSA 1 sends the end marker on an old path, that is, the PSA 1 sends the end marker to the I-UPF 2/PSA 2 through a user plane connection between the PSA 1 and the I-UPF 2/PSA 2. The I-UPF 2/PSA 2 sends the end marker to the RAN 2 through the N3 user plane connection (namely, the first user plane connection) between the I-UPF 2/PSA 2 and the RAN 2. It should be noted that an action of the I-UPF 2/PSA 2 is also applicable to the downlink data from the PSA 1. To be specific, the I-UPF 2/PSA 2 sends the downlink data from the PSA 1 to the RAN 2 through the N3 user plane connection between the I-UPF 2/PSA 2 and the RAN 2, and then the RAN 2 sends the downlink data from the N3 user plane connection to the UE through an air interface connection.

After receiving the end marker from the N3 user plane connection, the RAN 2 may send the buffered downlink data from the second user plane connection, namely, the downlink data from the PSA 2, to the UE.

According to the embodiment shown in FIG. 11A, FIG. 11B, and FIG. 11C, the problem of disorder of downlink data in the scenario shown in FIG. 2(c) is resolved, thereby improving user experience.

Figure 12A:
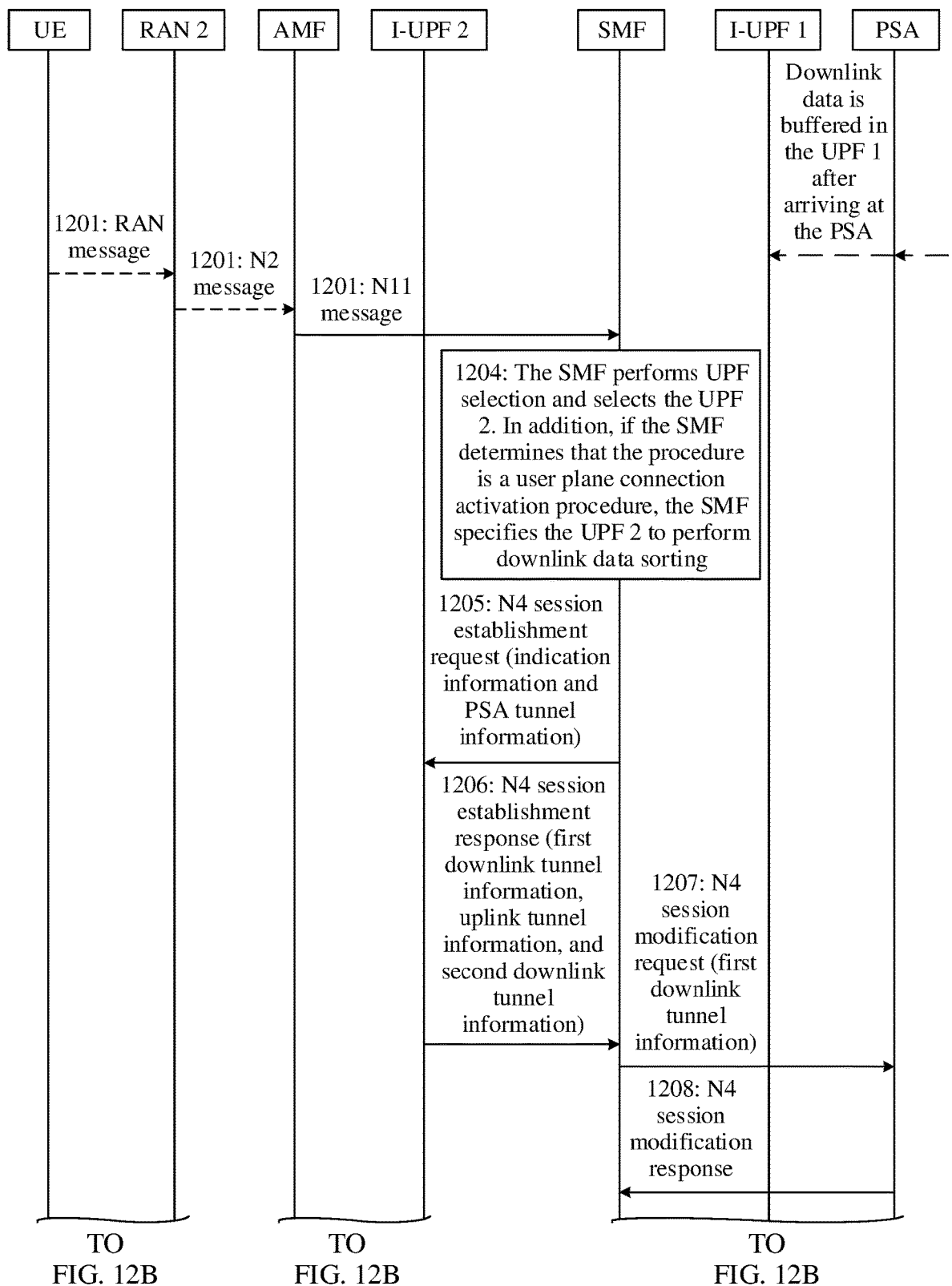
FIG. 12A and FIG. 12B is a flowchart of another method for controlling disorder of downlink data according to this application.
Figure 12B:
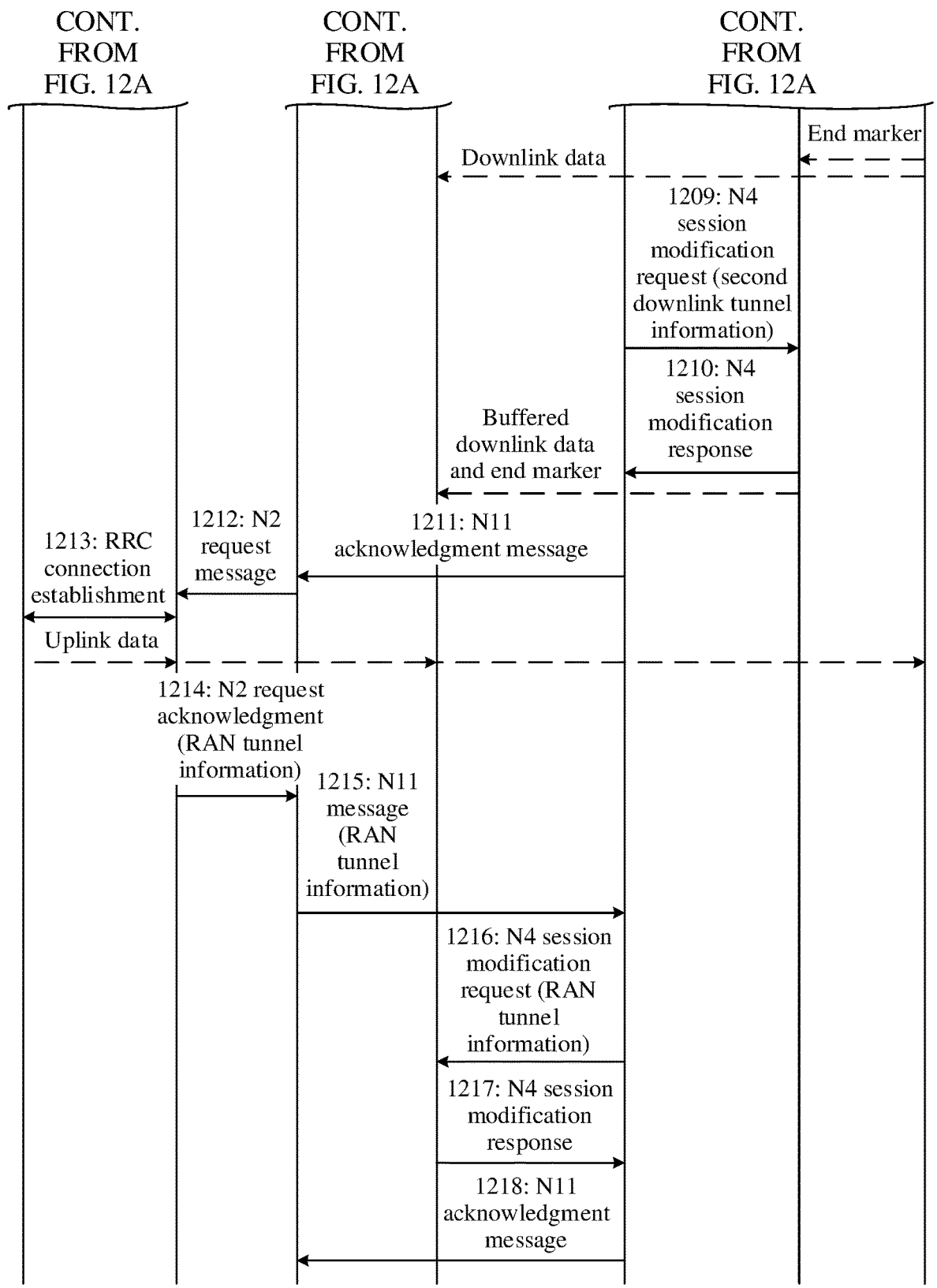

FIG. 12A and FIG. 12B show a method for controlling disorder of downlink data according to this application. The method is used to resolve the problem of disorder of downlink data in the user plane connection activation procedure shown in FIG. 3, and the method is specific implementation of the method in the embodiment shown in FIG. 4.

An AS sends downlink data to a PSA. The PSA forwards the downlink data to an I-UPF 1. The I-UPF 1 triggers the user plane connection activation procedure. The following describes the method for controlling disorder of downlink data in the user plane connection activation procedure. The method includes the following steps.

When UE is in an idle state, the UE needs to be found through paging, and then starts to perform step 1201; or when UE is in a connected state, the UE starts to perform step 1203.

Before steps shown in FIG. 12A and FIG. 12B are performed, the downlink data is sent by the AS to a PSA 1, and the PSA 1 sends the downlink data to the I-UPF 1 through a user plane connection between the PSA 1 and the I-UPF 1. Because a user plane connection between the I-UPF 1 and a RAN 2 is not activated, the I-UPF 1 buffers the downlink data.

Step 1201: The UE that is found through paging sends a RAN message to the RAN 2. The RAN message carries a service request message, and the service request message carries a session identifier (PDU session ID), and the like.

Step 1202: The RAN 2 sends an N2 message to an AMF. The N2 message carries the service request message and location information of the UE.

Step 1203: If the AMF determines, based on the location information of the UE and a service area of the I-UPF 1, that the UE is not located in the service area of the I-UPF 1, the AMF sends an N11 message to an SMF. The N11 message carries information such as a session identifier and an access type.

The N11 message may be used to trigger the SMF to reselect a UPF.

During specific implementation, the N11 message may be Nsmf_PDUSession_UpdateSMContextRequest.

Step 1204: The SMF performs UPF selection and selects an I-UPF 2. In addition, if the SMF determines that the procedure is the user plane connection activation procedure, the SMF specifies the I-UPF 2 to perform downlink data sorting.

That the SMF specifies the I-UPF 2 to perform downlink data sorting means that the SMF indicates the I-UPF 2 to: send the downlink data from the I-UPF 1, and then send, after an end marker sent by the I-UPF 1 is received, downlink data from the PSA to the RAN 2.

The SMF determines that a current procedure is the user plane connection activation procedure by using the following methods.

Method 1: If the AMF determines, based on the received service request message, that the current procedure is the user plane connection activation procedure, the AMF sends an indicator to the SMF in step 1203. Therefore, the SMF determines, based on the received indicator, that the current procedure is the user plane connection activation procedure.

Method 2: The SMF receives the N11 message in step 1203, and learns, based on the foregoing steps, that the I-UPF 1 buffers data. In other words, step 1203 is triggered by the buffered downlink data. In this case, the SMF determines that the current procedure is the user plane connection activation procedure.

The downlink data from the I-UPF 1 is the downlink data buffered by the I-UPF 1. The end marker is also referred to as an end marker and indicates that sending of the downlink data on an old path is completed.

Step 1205: The SMF sends an N4 session establishment request to the I-UPF 2. The N4 session establishment request carries indication information and PSA tunnel information.

The indication information indicates the I-UPF 2 to: send the downlink data from the I-UPF 1, and then send, after the end marker sent by the I-UPF 1 is received, the downlink data from the PSA to the RAN 2.

The PSA tunnel information sent to the I-UPF 2 is used to establish an uplink user plane connection between the I-UPF 2 and the PSA.

Step 1206: The I-UPF 2 returns an N4 session establishment response to the SMF. The N4 session establishment response carries first downlink tunnel information (also referred to as DL CN Tunnel info for the PSA), uplink tunnel information (UL CN Tunnel info for the RAN), and second downlink tunnel information (DL CN Tunnel info for data forwarding).

The DL CN tunnel info for the PSA is to be sent to the PSA, to establish a downlink user plane connection (which may also be referred to as a downlink tunnel) between the PSA and the I-UPF 2. The UL CN tunnel info for the RAN is to be sent to the RAN 2, to establish an uplink user plane connection between the RAN 2 and the I-UPF 2. The DL CN tunnel info for data forwarding is to be sent to the I-UPF 1, to establish a forwarding tunnel between the I-UPF 1 and the I-UPF 2.

Step 1207: The SMF sends an N4 session modification request to the PSA. The N4 session modification request carries the first downlink tunnel information (DL CN Tunnel info for the PSA).

Step 1208: The PSA returns an N4 session modification response to the SMF.

In this case, establishment of the downlink user plane connection between the I-UPF 2 and the PSA is completed. When the PSA receives the downlink data, the PSA sends the downlink data to the I-UPF 2 instead of the I-UPF 1. After receiving the downlink data sent by the PSA, the I-UPF 2 buffers the downlink data based on the indication information.

In addition, before updating the downlink user plane connection, the PSA sends the end marker to the I-UPF 1, to indicate that the end marker is a last packet on the old path.

Step 1209: The SMF sends an N4 session modification request to the I-UPF 1. The N4 session modification request carries the second downlink tunnel information (DL CN Tunnel info for data forwarding).

Step 1210: The I-UPF 1 returns an N4 session modification response to the SMF.

In this case, establishment of the forwarding tunnel between the I-UPF 1 and the I-UPF 2 is completed. The I-UPF 1 may send the buffered downlink data to the I-UPF 2.

In the following step 1211 to step 1218, an air interface connection between the UE and the RAN 2 and an N3 connection between the RAN 2 and the I-UPF 2 are established.

Step 1211: The SMF sends an N11 acknowledgment message to the AMF.

Optionally, the N11 acknowledgment message carries the uplink tunnel information (UL CN Tunnel info).

During specific implementation, the N11 acknowledgment message may be Nsmf_PDUSession_UpdateSMContext Response.

Step 1212: The AMF sends an N2 request message to the RAN 2.

Optionally, the N2 request message carries the uplink tunnel information (UL CN Tunnel info). Step 1213: The RAN 2 initiates a process of establishing a radio resource control (RRC) connection to the UE.

In this case, establishment of an uplink user plane connection between the UE, the RAN 2 and the I-UPF 2 is completed. In addition, establishment of an uplink user plane connection between the I-UPF 2 and the PSA has been completed in step 1205. In this case, the UE may send uplink data to the PSA via the RAN 2 and the I-UPF 2.

Step 1214: The RAN 2 returns an N2 request acknowledgment. The N2 request acknowledgment carries RAN tunnel information (RAN tunnel info).

The RAN tunnel info is used to be sent to the I-UPF 2, to establish a downlink user plane connection between the I-UPF 2 and the RAN 2.

Step 1215: The AMF sends an N11 message to the SMF. The N11 message carries the RAN tunnel information (RAN tunnel info).

During specific implementation, the N11 message may be Nsmf_PDUSession_UpdateSMContext Request.

Step 1216: The SMF sends an N4 session modification request to the I-UPF 2. The N4 session modification request carries the RAN tunnel information (RAN tunnel info).

Step 1217: The I-UPF 2 returns an N4 session modification response to the AMF.

Step 1218: The SMF returns an N11 acknowledgment message to the AMF.

During specific implementation, the N11 acknowledgment message may be Nsmf_PDUSession_UpdateSMContext Response.

The foregoing step 1217 and step 1218 are optional.

According to the embodiment shown in FIG. 12A and FIG. 12B, the problem of disorder of downlink data in the user plane connection activation procedure is resolved. According to this solution, disorder of downlink data can be avoided, thereby improving user experience.

Figure 13A:
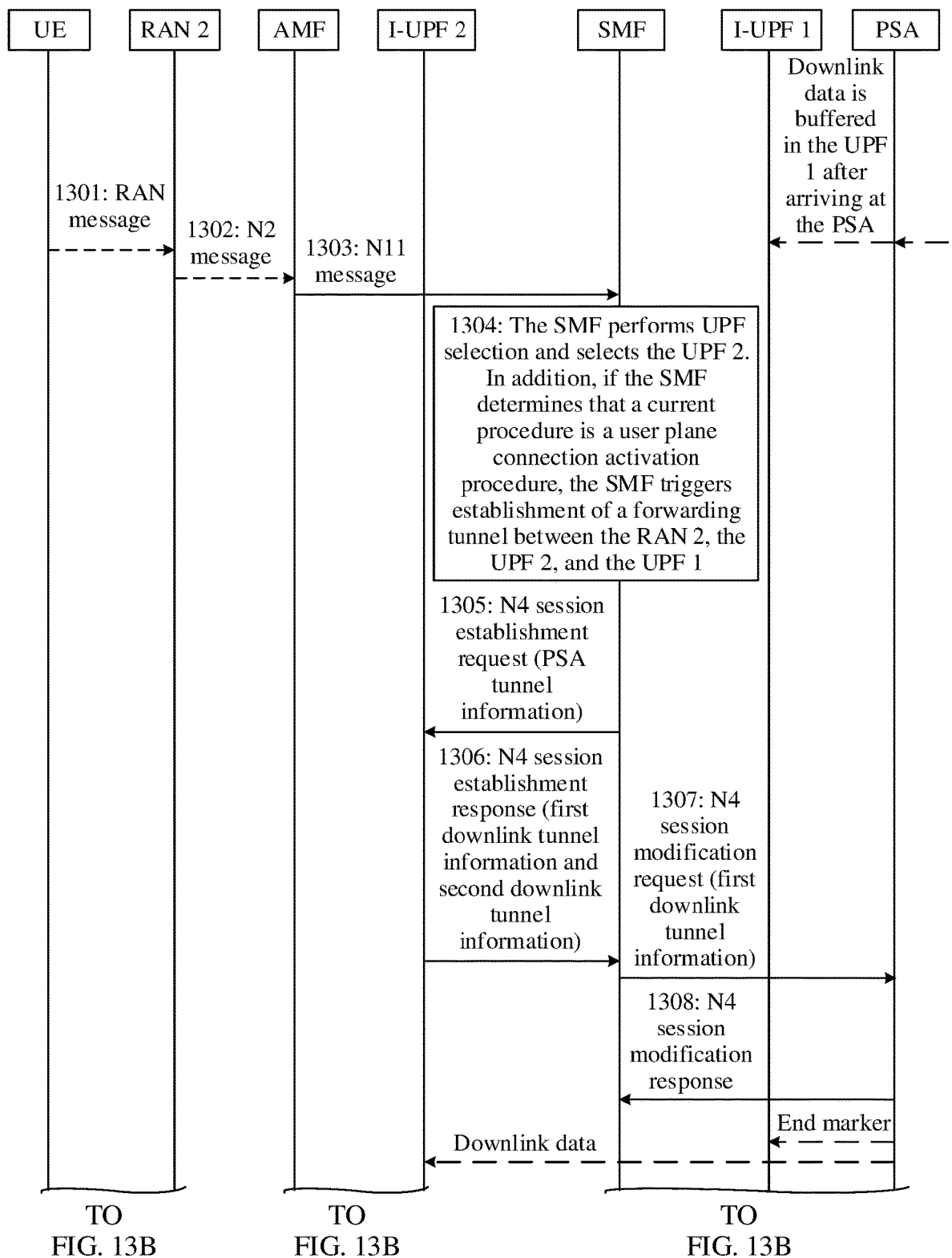
FIG. 13A and FIG. 13B is a flowchart of another method for controlling disorder of downlink data according to this application.
Figure 13B:
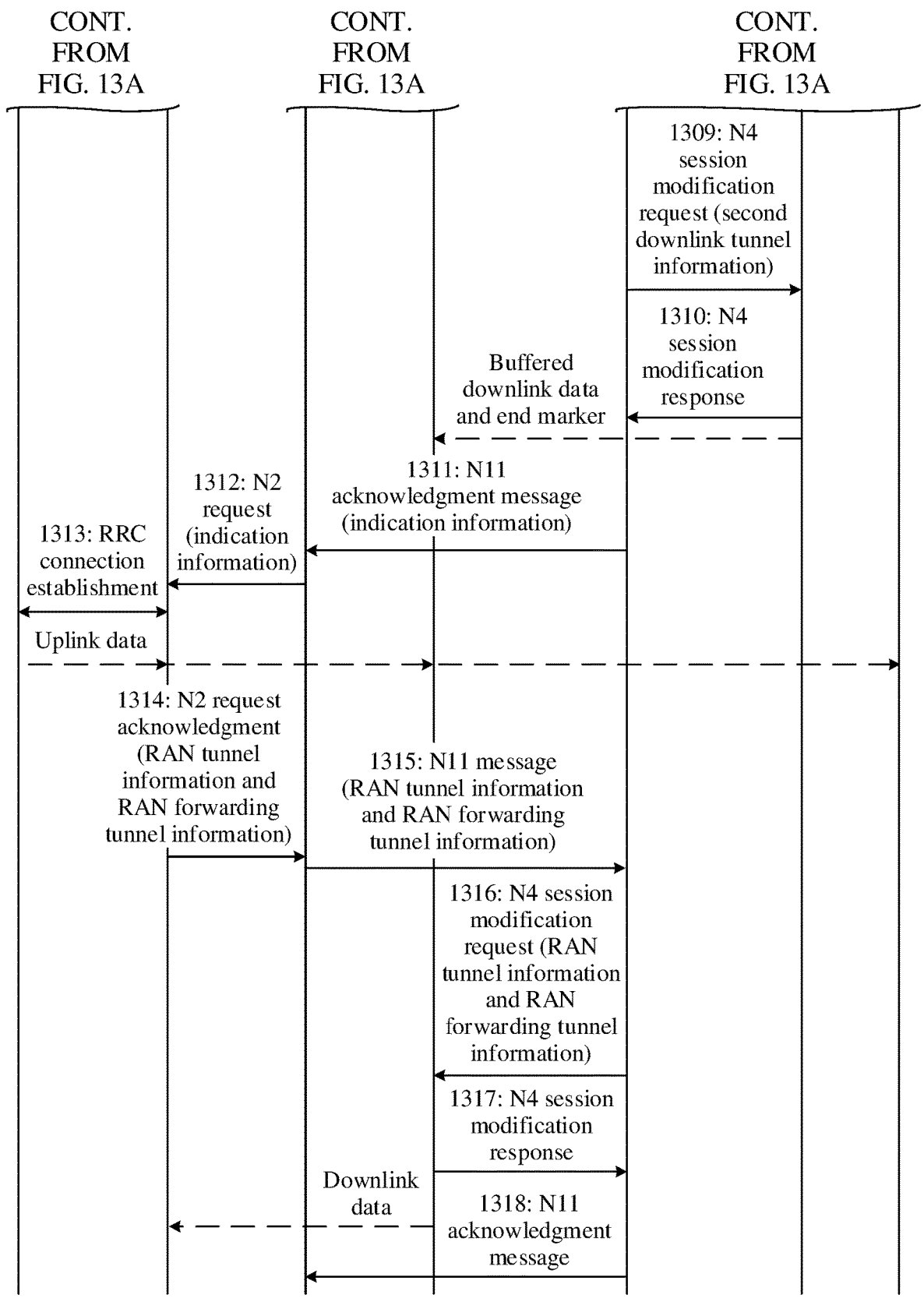

FIG. 13A and FIG. 13B show a method for controlling disorder of downlink data according to this application. The method is used to resolve the problem of disorder of downlink data in the user plane connection activation procedure shown in FIG. 3, and the method is specific implementation of the method in the embodiment shown in FIG. 6.

An AS sends downlink data to a PSA. The PSA forwards the downlink data to an I-UPF 1. The I-UPF 1 triggers the user plane connection activation procedure. The following describes the method for controlling disorder of downlink data in the user plane connection activation procedure. The method includes the following steps.

When UE is in an idle state, the UE needs to be found through paging, and then starts to perform step 1301; or when UE is in a connected state, the UE starts to perform step 1303.

Before steps shown in FIG. 13A and FIG. 13B are performed, the downlink data is sent by the AS to a PSA 1, and the PSA 1 sends the downlink data to the I-UPF 1 through a user plane connection between the PSA 1 and the I-UPF 1. Because a user plane connection between the I-UPF 1 and a RAN 2 is not activated, the I-UPF 1 buffers the downlink data.

The method includes the following steps.

Step 1301 to step 1303 are the same as step 1201 to step 1203 in the embodiment shown in FIG. 12A and FIG. 12B. Refer to the foregoing descriptions.

Step 1304: The SMF performs UPF selection and selects an I-UPF 2. In addition, if the SMF determines that a current procedure is the user plane connection activation procedure, the SMF triggers establishment of a forwarding tunnel between the RAN 2, the I-UPF 2, and the I-UPF 1.

The following step 1305 to step 1308 are used to establish a user plane connection between the I-UPF 2 and the PSA.

Step 1305: The SMF sends an N4 session establishment request to the I-UPF 2. The N4 session establishment request carries PSA tunnel information and indication information.

The PSA tunnel information is sent to the I-UPF 2, to establish an uplink user plane connection between the I-UPF 2 and the PSA.

The indication information indicates the I-UPF 2 to send, through a second user plane connection (N3 forwarding tunnel), downlink data of a second data transmission path to the RAN 2.

In this application, the indication information may also be referred to as second indication information.

Step 1306: The I-UPF 2 returns an N4 session establishment response to the SMF. The N4 session establishment response carries first downlink tunnel information (also referred to as DL CN Tunnel info for the PSA) and second downlink tunnel information (also referred to as DL CN Tunnel info for data forwarding). Optionally, the N4 session establishment response further carries first uplink tunnel information (UL CN Tunnel info for the RAN) and second uplink tunnel information (UL CN Tunnel info for RAN for new path).

The DL CN tunnel info for the PSA is used to be sent to the PSA, to establish a downlink user plane connection between the PSA and the I-UPF 2. The DL CN tunnel info for data forwarding is used to be sent to the I-UPF 1, to establish a forwarding tunnel between the I-UPF 1 and the I-UPF 2. The UL CN tunnel info for the RAN is used to be sent to the RAN 2, to establish a first uplink user plane connection (also referred to as a first uplink tunnel) between the RAN 2 and the I-UPF 2. The UL CN tunnel info for RAN for new path is used to be sent to the RAN 2, to establish a second uplink user plane connection (also referred to as a second uplink tunnel) between the RAN 2 and the I-UPF 2.

A first user plane connection between the I-UPF 2 and the RAN 2 includes a first downlink user plane connection (also referred to as an N3 forwarding tunnel) and the first uplink user plane connection (also referred to as the first uplink tunnel). The second user plane connection between the I-UPF 2 and the RAN 2 includes a second downlink user plane connection (also referred to as an N3 user plane connection) and the second uplink user plane connection (also referred to as the second uplink tunnel).

Step 1307: The SMF sends an N4 session modification request to the PSA. The N4 session modification request carries the first downlink tunnel information (DL CN Tunnel info for the PSA).

Step 1308: The PSA returns an N4 session modification response.

In this case, establishment of a downlink user plane path between the I-UPF 2 and the PSA is completed. It should be noted that, before changing a sending path of the downlink data, the PSA sends an end marker on an old path (namely, a path on which the nodes PSA, I-UPF 1, and I-UPF 2 are located). After PSA path changing, if the PSA further receives downlink data, the PSA sends the downlink data to the I-UPF 2.

Step 1309: The SMF sends an N4 session modification request to the I-UPF 1. The N4 session modification request carries the second downlink tunnel information (DL CN Tunnel info for data forwarding).

Step 1310: The I-UPF 1 returns an N4 session modification response.

In this case, establishment of the forwarding tunnel between the I-UPF 1 and the I-UPF 2 is completed. The I-UPF 1 may send the buffered downlink data (data before step 1301) and the end marker to the I-UPF 2.

The following step 1311 to step 1317 are used to establish the N3 user plane connection between the RAN 2 and the I-UPF 2 and the N3 forwarding tunnel between the RAN 2 and the I-UPF 2. The N3 user plane connection is used to transmit downlink data from the I-UPF 1, and the N3 forwarding tunnel is used to transmit downlink data from the I-UPF 2.

Step 1311: The SMF sends an N11 acknowledgment message to the AMF. The N11 acknowledgment message carries indication information, and the indication information indicates the RAN 2 to allocate forwarding tunnel information.

In this application, the indication information may also be referred to as first indication information.

Optionally, the N11 acknowledgment message further carries the first uplink tunnel information (UL CN Tunnel info for the RAN) and the second uplink tunnel information (UL CN Tunnel info for RAN for new path).

In an embodiment, the N11 acknowledgment message may be specifically Nsmf_PDUSession_UpdateSMContext Response.

Step 1312: The AMF sends an N2 request to the RAN 2. The N2 request carries the indication information.

Optionally, the N2 request further carries the first uplink tunnel information (UL CN Tunnel info for the RAN) and the second uplink tunnel information (UL CN Tunnel info for RAN for new path).

Step 1313: The RAN 2 initiates an RRC connection between the RAN 2 and the UE, to establish an air interface connection.

Step 1314: The RAN 2 allocates RAN tunnel information (RAN tunnel info) and RAN forwarding tunnel information (RAN tunnel info for data forwarding) based on the indication information, and sends an N2 request acknowledgment to the AMF. The N2 request acknowledgment carries the RAN tunnel information (RAN tunnel info) and the RAN forwarding tunnel information (RAN tunnel info for data forwarding).

The RAN tunnel information (RAN tunnel info) may also be referred to as N3 user plane connection tunnel information, and is used to be sent to the I-UPF 2, to establish the N3 user plane connection between the I-UPF 2 and the RAN 2. The N3 user plane connection is used to transmit the downlink data (namely, the downlink data from the I-UPF 1) of the old path (namely, a first data transmission path).

The RAN forwarding tunnel information (RAN tunnel info for data forwarding) may also be referred to N3 forwarding tunnel information, and is used to be sent to the I-UPF 2, to establish the N3 forwarding tunnel between the I-UPF 2 and the RAN 2. The N3 forwarding tunnel is used to transmit the downlink data (namely, the downlink data from the I-UPF 2) of a new path (namely, the second data transmission path). The RAN 2 allocates the RAN forwarding tunnel information (RAN tunnel info for data forwarding) based on the indication information received in step 1312.

Step 1315: The AMF sends an N11 message to the SMF. The N11 message carries the RAN tunnel information (RAN tunnel info) and the RAN forwarding tunnel information (RAN tunnel info for data forwarding).

During specific implementation, the N11 message may be Nsmf_PDUSession_UpdateSMContext Request.

Step 1316: The SMF sends an N4 session modification request to the I-UPF 2. The N4 session modification request carries the RAN tunnel information (RAN tunnel info) and the RAN forwarding tunnel information (RAN tunnel info for data forwarding).

Step 1317: The I-UPF 2 returns an N4 session modification response.

Step 1318: The SMF returns an N11 acknowledgment message to the AMF.

During specific implementation, the N11 acknowledgment message may be Nsmf_PDUSession_UpdateSMContext Response.

The foregoing step 1317 and step 1318 are optional.

In this case, establishment of the N3 forwarding tunnel between the RAN 2 and the I-UPF 2 is completed, and establishment of the N3 user plane connection between the RAN 2 and the I-UPF 2 is also completed. In this case, the I-UPF 2 can send the received data to the RAN 2. Specifically, the I-UPF 2 sends, to the RAN 2 through the N3 user plane connection between the I-UPF 2 and the RAN 2, the downlink data received from the I-UPF 1 and the end marker; and the I-UPF 2 sends, to the RAN 2 through the N3 forwarding tunnel between the I-UPF 2 and the RAN 2, the downlink data received from the PSA.

According to the embodiment shown in FIG. 13A and FIG. 13B, the problem of disorder of downlink data in the user plane connection activation procedure is resolved. According to this solution, disorder of downlink data can be avoided, thereby improving user experience.

For the foregoing embodiments shown in FIG. 10A, FIG. 10B, and FIG. 10C, FIG. 11A, FIG. 11B, and FIG. 11C, and FIG. 13A and FIG. 13B, the first user plane connection (also referred to as the N3 user plane connection) is used to transmit data of the first data transmission path, that is, used to transmit old data; and the second user plane connection (also referred to as the N3 forwarding tunnel) is used to transmit data of the second data transmission path, that is, used to transmit new data. In an alternative implementation, the first user plane connection (also referred to as the N3 user plane connection) may be used to transmit data of the second data transmission path, that is, used to transmit new data; and the second user plane connection (also referred to as the N3 forwarding tunnel) may be used to transmit data of the first data transmission path, that is, used to transmit old data. This is not limited in this application.

It may be understood that, to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in the present disclosure. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present disclosure.

Figure 14:
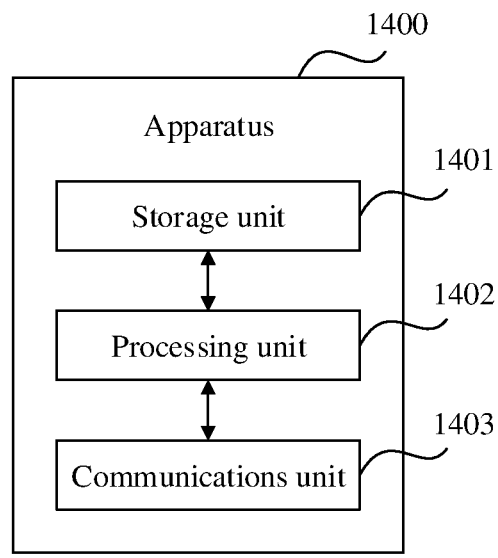
FIG. 14 is a schematic diagram of an apparatus according to this application.

FIG. 14 is a possible example block diagram of an apparatus 1400 according to this application. The apparatus 1400 may exist in a form of software. The apparatus 1400 may include a processing unit 1402 and a communications unit 1403. In an embodiment, the communications unit 1403 may include a receiving unit and a sending unit. The processing unit 1402 is configured to control and manage an action of the apparatus 1400. The communications unit 1403 is configured to support the apparatus 1400 in communicating with another network entity. The apparatus 1400 may further include a storage unit 1401, configured to store program code and data that are of the apparatus 1400.

The processing unit 1402 may be a processor or a controller, for example, may be a general purpose central processing unit (CPU), a general purpose processor, digital signal processing (DSP), an application-specific integrated circuit (ASIC), a field programmable gate array (FPGA) or another programmable logic device, a transistor logic device, a hardware component, or any combination thereof. The processing unit 1402 may implement or execute various example logical blocks, modules, and circuits described with reference to content disclosed in the present disclosure. The processor may be a combination of processors implementing a computing function, for example, a combination including one or more microprocessors, or a combination of the DSP and a microprocessor. The communications unit 1403 may be a communications interface, a transceiver, a transceiver circuit, or the like. The communications interface is a general name. During specific implementation, the communications interface may include a plurality of interfaces. The storage unit 1401 may be a memory.

In the first application, the apparatus 1400 may be the access network device in any one of the foregoing embodiments, or may be a chip that can be used for the access network device. For example, when the apparatus 1400 is the access network device, the processing unit may be, for example, a processor, and the communications unit may be, for example, a transceiver. Optionally, the transceiver may include a radio frequency circuit, and the storage unit may be, for example, a memory. For example, when the apparatus 1400 is the chip that can be used for the access network device, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is in the access network device and that is located outside the chip, such as a read-only memory (ROM), another type of static storage device that can store static information and instructions, or a random access memory (RAM).

In an embodiment, the receiving unit is configured to: receive downlink data, of a first data transmission path, sent by a path aggregation network element through a first user plane connection between the path aggregation network element and the access network device; and receive downlink data, of a second data transmission path, sent by the path aggregation network element through a second user plane connection between the path aggregation network element and the access network device. The first data transmission path is a data transmission path before path switching, and the second data transmission path is a data transmission path after path switching. The sending unit is configured to send the downlink data of the second data transmission path after sending of the downlink data of the first data transmission path is completed.

In an embodiment, the receiving unit is further configured to receive indication information sent by a control plane network element. The indication information indicates the access network device to allocate tunnel information of the second user plane connection. The access network device allocates the tunnel information of the second user plane connection, and sends the tunnel information of the second user plane connection to the control plane network element.

In an embodiment, the first data transmission path is a path before session anchor changing in a session anchor change procedure, and the second data transmission path is a path after session anchor changing.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In an embodiment, the first data transmission path is a path before user plane path switching in a user plane connection activation procedure, and the second data transmission path is a path after user plane path switching in the user plane connection activation procedure.

In an embodiment, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

In the second application, the apparatus 1400 may be the path aggregation network element (for example, a user plane network element, an access network device, or a session anchor) in any one of the foregoing embodiments, or may be a chip that can be used for the path aggregation network element. For example, when the apparatus 1400 is the path aggregation network element, the processing unit may be, for example, a processor, and the communications unit may be, for example, a transceiver. Optionally, the transceiver may include a radio frequency circuit, and the storage unit may be, for example, a memory. For example, when the apparatus 1400 is the chip that can be used for the path aggregation network element, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is in the path aggregation network element and that is located outside the chip, such as a ROM, another type of static storage device that can store static information and instructions, or a RAM.

In an embodiment, the receiving unit is configured to receive indication information from a control plane network element. The sending unit is configured to send, based on the indication information, downlink data of a second data transmission path after sending of downlink data of a first data transmission path is completed. The first data transmission path is a data transmission path before switching, and the second data transmission path is a data transmission path after switching.

In an embodiment, the indication information indicates the path aggregation network element to send, until an end marker of the first data transmission path is received, a downlink data packet of the second data transmission path. The end marker indicates that transmission of the downlink data of the first data transmission path is completed.

In an embodiment, in a session anchor change procedure, wherein the first data transmission path passes through a data network, a first session anchor, and an access network device, and the second data transmission path passes through the data network, a second session anchor, and the access network device, the path aggregation network element is the access network device. Alternatively, in a session anchor change procedure, wherein the first data transmission path passes through a data network, a first session anchor, and a user plane network element, and the second data transmission path passes through the data network, a second session anchor, and the user plane network element, the path aggregation network element is the user plane network element. Alternatively, in a session anchor change procedure, wherein the first data transmission path passes through a data network, a first session anchor, and a second session anchor, and the second data transmission path passes through the data network and the second session anchor, the path aggregation network element is the second session anchor.

In an embodiment, in a user plane connection activation procedure, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

In another embodiment, the receiving unit is configured to receive downlink data of a first data transmission path and downlink data of a second data transmission path. The sending unit is configured to: send the downlink data of the first data transmission path to an access network device through a first user plane connection between the path aggregation network element and the access network device; and send the downlink data of the second data transmission path to the access network device through a second user plane connection between the path aggregation network element and the access network device.

In an embodiment, before receiving the downlink data of the first data transmission path and the downlink data of the second data transmission path, the receiving unit further receives indication information from a control plane network element. The indication information indicates the path aggregation network element to send, through the second user plane connection between the path aggregation network element and the access network device, the downlink data of the second data transmission path to the access network device.

In an embodiment, the receiving unit is configured to receive tunnel information, of the second user plane connection of the access network device, sent by the control plane network element.

In an embodiment, the first data transmission path is a path before session anchor changing in a session anchor change procedure, and the second data transmission path is a path after session anchor changing.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In an embodiment, the first data transmission path is a path before user plane path switching in a user plane connection activation procedure, and the second data transmission path is a path after user plane path switching in the user plane connection activation procedure.

In an embodiment, wherein the first data transmission path passes through a data network, a session anchor, and a first user plane network element, the second data transmission path passes through the data network, the session anchor, and a second user plane network element, and there is a connection between the first user plane network element and the second user plane network element after user plane path switching, the path aggregation network element is the second user plane network element.

In the third application, the apparatus 1400 may be the control plane network element (for example, a session management network element) in any one of the foregoing embodiments, or may be a chip that can be used for the control plane network element. For example, when the apparatus 1400 is the control plane network element, the processing unit may be, for example, a processor, and the communications unit may be, for example, a transceiver. Optionally, the transceiver may include a radio frequency circuit, and the storage unit may be, for example, a memory. For example, when the apparatus 1400 is the chip that can be used for the control plane network element, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is in the control plane network element and that is located outside the chip, such as a ROM or another type of static storage device that can store static information and instructions, or a RAM.

In an embodiment, the processing unit is configured to determine to perform data transmission path switching.

The sending unit is configured to send indication information to a path aggregation network element. The indication information indicates the path aggregation network element to send, after sending of downlink data of a first data transmission path is completed, downlink data of a second data transmission path. The first data transmission path is a data transmission path before switching, and the second data transmission path is a data transmission path after switching.

In an embodiment, the indication information indicates the path aggregation network element to send, until an end marker of the first data transmission path is received, a downlink data packet of the second data transmission path. The end marker indicates that transmission of the downlink data of the first data transmission path is completed.

In an embodiment, the processing unit is specifically configured to determine, in a session anchor change procedure, to switch from a first session anchor to a second session anchor. The first session anchor is located on the first data transmission path, and the second session anchor is located on the second data transmission path.

In an embodiment, wherein the first data transmission path passes through a data network, the first session anchor, and an access network device, and the second data transmission path passes through the data network, the second session anchor, and the access network device, the path aggregation network element is the access network device. Alternatively, wherein the first data transmission path passes through a data network, the first session anchor, and a user plane network element, and the second data transmission path passes through the data network, the second session anchor, and the user plane network element, the path aggregation network element is the user plane network element. Alternatively, wherein the first data transmission path passes through a data network, the first session anchor, and the second session anchor, and the second data transmission path passes through the data network and the second session anchor, the path aggregation network element is the second session anchor.

In an embodiment, the processing unit is specifically configured to determine, in a user plane connection activation procedure, to switch from a first user plane network element to a second user plane network element. Wherein the first data transmission path passes through a data network, a session anchor, and the first user plane network element, the second data transmission path passes through the data network, the session anchor, and the second user plane network element, and there is a connection between the first user plane network element and the second user plane network element after user plane path switching, the path aggregation network element is the second user plane network element.

In another embodiment, the processing unit is configured to: establish a first user plane connection between a path aggregation network element and an access network device in an access network device switching procedure; and establish a second user plane connection between the path aggregation network element and the access network device in a session anchor change procedure. The first user plane connection is used by the path aggregation network element to send, to the access network device, downlink data received from a first data transmission path, and the second user plane connection is used by the path aggregation network element to send, to the access network device, downlink data received from a second data transmission path. The first data transmission path is a path before session anchor changing in the session anchor change procedure, and the second data transmission path is a path after session anchor changing.

In an embodiment, wherein the first data transmission path passes through a data network, a first session anchor, and a user plane network element, and the second data transmission path passes through the data network, a second session anchor, and the user plane network element, the path aggregation network element is the user plane network element. Alternatively, wherein the first data transmission path passes through a data network, a first session anchor, and a second session anchor, and the second data transmission path passes through the data network and the second session anchor, the path aggregation network element is the second session anchor.

In an embodiment, the processing unit is specifically configured to: control the sending unit to send first indication information to the access network device, where the first indication information indicates the access network device to allocate tunnel information of the second user plane connection; control the receiving unit to receive the tunnel information of the second user plane connection from the access network device; and control the sending unit to send the tunnel information of the second user plane connection to the path aggregation network element.

In an embodiment, the sending unit is configured to send second indication information to the path aggregation network element. The second indication information indicates the path aggregation network element to send, through a tunnel of the second user plane connection, the downlink data of the second data transmission path to the access network device.

In another embodiment, the processing unit is configured to: determine, in a user plane connection activation procedure, to switch from a first user plane network element to a second user plane network element; and establish a first user plane connection between the second user plane network element and an access network device, and establish a second user plane connection between the second user plane network element and the access network device. The first user plane connection is used by a path aggregation network element to send, to the access network device, downlink data received from a first data transmission path, and the second user plane connection is used by the path aggregation network element to send, to the access network device, downlink data received from a second data transmission path. The first data transmission path is a path before user plane network element switching, and the second data transmission path is a path after user plane network element switching.

In an embodiment, the first data transmission path passes through a data network, a session anchor, and the first user plane network element, the second data transmission path passes through the data network, the session anchor, and the second user plane network element, and there is a connection between the first user plane network element and the second user plane network element.

In an embodiment, the processing unit is specifically configured to: control the sending unit to send first indication information to the access network device, where the first indication information indicates the access network device to allocate tunnel information of the second user plane connection; control the receiving unit to receive the tunnel information of the second user plane connection from the access network device; and control the sending unit to send the tunnel information of the second user plane connection to the second user plane network element.

In an embodiment, the sending unit is configured to send second indication information to the second user plane network element. The second indication information indicates the second user plane network element to send, through the second user plane connection, the downlink data of the second data transmission path to the access network device.

Figure 15:
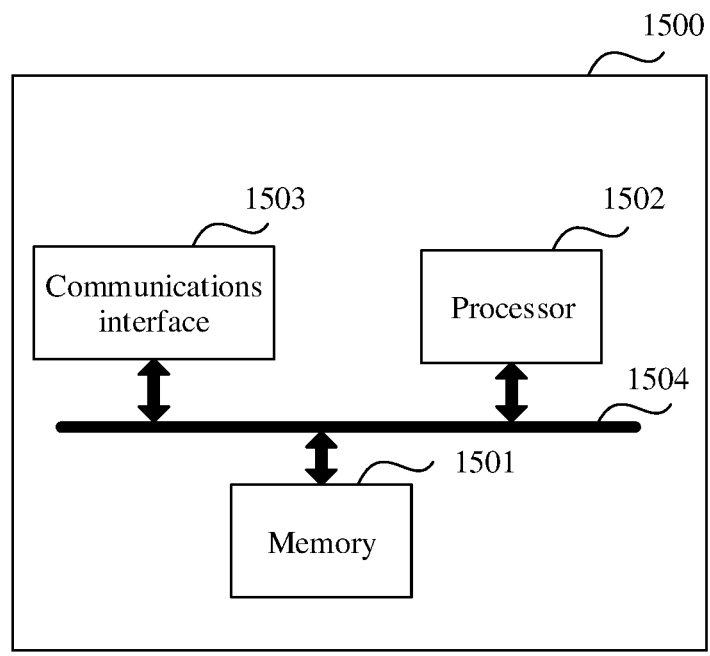
FIG. 15 is a schematic diagram of another apparatus according to this application.

FIG. 15 is a schematic diagram of an apparatus according to this application. The apparatus may be the control plane network element, the path aggregation network element, or the access network device. The apparatus 1500 includes a processor 1502, a communications interface 1503, and a memory 1501. Optionally, the apparatus 1500 may further include a bus 1504. The communications interface 1503, the processor 1502, and the memory 1501 may be connected to each other by using a communications line 1504. The communications line 1504 may be a peripheral component interconnect (PCI) bus, an extended industry standard architecture (EISA) bus, or the like. The communications line 1504 may be classified into an address bus, a data bus, a control bus, and the like. For ease of representation, only one thick line is used to represent the bus in FIG. 15, but this does not mean that there is only one bus or only one type of bus.

The processor 1502 may be a CPU, a microprocessor, an ASIC, or one or more integrated circuits configured to control program execution in the solutions of this application.

The communications interface 1503 uses any apparatus like a transceiver, and is configured to communicate with another device or a communications network such as the ethernet, a radio access network (RAN), a wireless local area network (WLAN), a wired access network, or the like.

The memory 1501 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the communications line 1504. Alternatively, the memory may be integrated with the processor.

The memory 1501 is configured to store computer-executable instructions for performing the solutions in this application, and the processor 1502 controls execution of the computer-executable instructions. The processor 1502 is configured to execute the computer-executable instructions stored in the memory 1501, to implement the method for controlling disorder of downlink data according to the foregoing embodiments of this application.

Optionally, the computer-executable instructions in the embodiments of this application may also be referred to as application program code. This is not specifically limited in this embodiment of this application.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an ASIC, a FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to this application without departing from the spirit and scope of this application. Correspondingly, the specification and the accompanying drawings are merely example descriptions of this application defined by the appended claims, and are intended to cover any of or all modifications, variations, combinations, or equivalents within the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A non-transitory computer-readable storage medium storing a program to be executed by one or more processors, the program including instructions, which when executed by the one or more processors cause an apparatus to perform the operations of:

receiving indication information from a control plane device, wherein a transmission path before switching passes through a data network, a session anchor, and a first user plane device, and a transmission path after switching passes through the data network, the session anchor, and the apparatus;

receiving downlink data from the session anchor;

buffering, according to the indication information, the downlink data received from the session anchor; and sending the buffered downlink data after reception, by the apparatus, of an end marker from the first user plane device, wherein there is a connection between the first user plane device and the apparatus through which the end marker is passed from the first user plane device to the apparatus.

2. The non-transitory computer-readable storage medium according to claim 1, wherein the indication information indicates to the apparatus to send the downlink data from the session anchor after sending of downlink data from the first user plane device is completed.

3. The non-transitory computer-readable storage medium according to claim 1, wherein the indication information indicates to the apparatus to send the downlink data from the session anchor after reception of the end marker from the first user plane device.

4. The non-transitory computer-readable storage medium according to claim 1, wherein the indication information is received in a user plane connection activation procedure.

5. A non-transitory computer-readable storage medium storing a program to be executed by one or more processors, the program including instructions, which when executed by the one or more processors cause an apparatus to perform the operations of:

determining to switch from a first user plane device to a second user plane device; and sending indication information to the second user plane device, wherein the indication information indicates to the second user plane device to buffer downlink data from a session anchor, wherein a transmission path, before the switch from the first user plane device to the second user plane device, passes through a data network, the session anchor, and the first user plane device, a transmission path after the switch passes through the data network, the session anchor, and the second user plane device, and there is a connection between the first user plane device and the second user plane device, and wherein the indication information indicates to the second user plane device to send the downlink data from the session anchor after reception, by the second user plane device, of an end marker from the first user plane device via the connection.

6. The non-transitory computer-readable storage medium according to claim 5, wherein the indication information indicates to the second user plane device to send the downlink data from the session anchor after sending of downlink data from the first user plane device is completed.

7. The non-transitory computer-readable storage medium according to claim 5, wherein, during the determining, the apparatus determines, in a user plane connection activation procedure, to switch from the first user plane device to the second user plane device.

8. A method, comprising:

determining, by a control plane device, to switch from a first user plane device to a second user plane device, wherein a transmission path before switching passes through a data network, a session anchor, and the first user plane device, and a transmission path after switching passes through the data network, the session anchor, and the second user plane device;

sending, by the control plane device, indication information to the second user plane device;

receiving, by the second user plane device, the indication information from the control plane device;

receiving, by the second user plane device, downlink data from the session anchor;

buffering, by the second user plane device according to the indication information, the downlink data received from the session anchor; and sending the buffered downlink data after reception, by the second user plane device, of an end marker from the first user plane device, wherein there is a connection between the first user plane device and the second user plane device through which the end marker is passed from the first user plane device to the second user plane device.

9. The method according to claim 8, wherein the indication information indicates to the second user plane device to send the downlink data from the session anchor after sending of downlink data from the first user plane device is completed.

10. The method according to claim 8, wherein the indication information indicates to the second user plane device to send the downlink data from the session anchor after reception of the end marker from the first user plane device.

11. The method according to claim 8, wherein the indication information is received in a user plane connection activation procedure.

12. A system, comprising:

a control plane device, configured to:

determine to switch from a first user plane device to a second user plane device, wherein a transmission path before switching passes through a data network, a session anchor, and the first user plane device, and a transmission path after switching passes through the data network, the session anchor, and the second user plane device; and send indication information to the second user plane device;

the second user plane device, configured to;

receive the indication information from the control plane device;

receive downlink data from the session anchor;

buffer, according to the indication information, the downlink data received from the session anchor; and send the buffered downlink data after reception, by the second user plane device, of an end marker from the first user plane device, wherein there is a connection between the first user plane device and the second user plane device through which the end marker is passed from the first user plane device to the second user plane device.

13. The system according to claim 12, wherein the indication information indicates to the second user plane device to send the downlink data from the session anchor after sending of downlink data from the first user plane device is completed.

14. The system according to claim 12, wherein the indication information indicates to the second user plane device to send the downlink data from the session anchor after reception of the end marker from the first user plane device.

15. The system according to claim 12, wherein the indication information is received in a user plane connection activation procedure.

* * * * *